(12) United States Patent
McCrory et al.

(10) Patent No.: US 12,411,746 B2
(45) Date of Patent: *Sep. 9, 2025

(54) PERVASIVE DATA CENTER ARCHITECTURE SYSTEMS AND METHODS

(71) Applicant: Digital Realty Trust, Inc., Austin, TX (US)

(72) Inventors: Dave Dennis McCrory, Boston, MA (US); Anthony Bennett Bishop, Southlake, TX (US)

(73) Assignee: Digital Realty Trust, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,082

(22) Filed: Feb. 6, 2024

(65) Prior Publication Data

US 2024/0256411 A1 Aug. 1, 2024

Related U.S. Application Data

(63) Continuation of application No. 18/185,973, filed on Mar. 17, 2023, now Pat. No. 11,928,041, which is a
(Continued)

(51) Int. Cl.
*G06F 15/177* (2006.01)
*G06F 11/30* (2006.01)
(Continued)

(52) U.S. Cl.
CPC ...... *G06F 11/3051* (2013.01); *G06F 11/3006* (2013.01); *G06F 11/3409* (2013.01);
(Continued)

(58) Field of Classification Search
None
See application file for complete search history.

(56) References Cited

U.S. PATENT DOCUMENTS 7,769,843 B2    8/2010   Neuse et al.
8,473,325 B2    6/2013   Barnhill, Jr. et al.
(Continued)

FOREIGN PATENT DOCUMENTS

KR   10-2016-0074507    6/2016
WO   WO 2022/067327    3/2022

OTHER PUBLICATIONS

International Search Report and Written Opinion issued in PCT Application No. PCT/US2021/071575, dated Jan. 5, 2022, in 9 pages.
(Continued)

*Primary Examiner* — Phuoc H Nguyen
(74) *Attorney, Agent, or Firm* — Knobbe, Martens, Olson & Bear, LLP

(57) ABSTRACT

Embodiments of a system for determining a data gravity index score and implementing pervasive data center architecture is disclosed. In some embodiments, the system can calculate a data gravity index score based on the amount of data stored in a given location, an amount of data in motion in the given location, a bandwidth index associated with the given location, and a latency index associated with the given location. Based on data gravity index scores, in some embodiments, the system can localize traffic to improve network performance, improve security operations, and generate software-defined-network overlay.

20 Claims, 9 Drawing Sheets

Related U.S. Application Data continuation of application No. 17/483,575, filed on Sep. 23, 2021, now Pat. No. 11,645,182.

(60) Provisional application No. 63/083,763, filed on Sep. 25, 2020.

(51) Int. Cl.
    *G06F 11/34*     (2006.01)
    *G06N 5/022*     (2023.01)
    *G06N 5/04*     (2023.01)
    *G06N 20/00*     (2019.01)

(52) U.S. Cl.
    CPC ............... *G06N 5/022* (2013.01); *G06N 5/04* (2013.01); *G06N 20/00* (2019.01)

(56) References Cited

U.S. PATENT DOCUMENTS

| | | | |
|---|---|---|---|
| 8,560,677 B2 | 10/2013 | Vangilder et al. | |
| 10,789,278 B1* | 9/2020 | Florance | G06F 16/9537 |
| 11,449,743 B1 | 9/2022 | Scott | |
| 11,452,032 B2 | 9/2022 | Gupta et al. | |
| 11,645,182 B2 | 5/2023 | McCrory et al. | |
| 11,928,041 B2 | 3/2024 | McCrory et al. | |
| 2008/0229024 A1* | 9/2008 | Plamondon | H04L 67/56 |
| | | | 709/218 |
| 2008/0229025 A1* | 9/2008 | Plamondon | G06F 12/0862 |
| | | | 709/218 |
| 2009/0281846 A1 | 11/2009 | Rose | |
| 2010/0070448 A1 | 3/2010 | Omoigui | |
| 2012/0311614 A1 | 12/2012 | Deanna et al. | |
| 2012/0317167 A1 | 12/2012 | Rahman et al. | |
| 2014/0344400 A1* | 11/2014 | Varney | H04L 45/745 |
| | | | 709/217 |
| 2015/0088812 A1* | 3/2015 | Ziauddin | G06F 16/21 |
| | | | 707/609 |
| 2016/0042278 A1* | 2/2016 | Baughman | H04L 67/568 |
| | | | 706/52 |
| 2019/0339687 A1 | 11/2019 | Cella et al. | |
| 2020/0348662 A1 | 11/2020 | Cella et al. | |
| 2021/0019067 A1 | 1/2021 | Miller | |
| 2021/0117425 A1 | 4/2021 | Rao et al. | |
| 2021/0406733 A1 | 12/2021 | Dubey | |
| 2022/0019367 A1 | 1/2022 | Freilich | |
| 2022/0019385 A1 | 1/2022 | Karr | |
| 2022/0100625 A1 | 3/2022 | McCrory et al. | |
| 2022/0300413 A1 | 9/2022 | Kannon | |
| 2023/0305732 A1 | 9/2023 | Karr | |

OTHER PUBLICATIONS

European Extended Search Report, re EP Application No. 21873670.0, dated Sep. 26, 2024.

International Preliminary Report on Patentability for PCT/US2021/071575, issued Mar. 28, 2023 in 7 pages.

* cited by examiner

PERVASIVE DATA CENTER ARCHITECTURE SYSTEMS AND METHODS

CROSS-REFERENCE TO RELATED APPLICATIONS

This application is a continuation of U.S. patent application Ser. No. 18/185,973, filed Mar. 17, 2023, which is a continuation of U.S. patent application Ser. No. 17/483,575, filed Sep. 23, 2021, which claims priority from provisional U.S. Pat. App. No. 63/083,763, filed on Sep. 25, 2020, all of which are hereby incorporated by reference herein in their entirety.

BACKGROUND

The present disclosure relates generally to systems and methods for managing data stores across platforms and data stores.

SUMMARY OF THE DISCLOSURE

In one embodiment, a system for assessing disparate storage of data among a number of storage devices is disclosed. The system includes: a processor; a memory; a data gravity analytics configuration module; a knowledge database stored in the memory; and computer code stored in the memory, wherein the computer code, when retrieved from the memory and executed by the processor causes the processor to: receive information about one or more nodes from a plurality of forensic source submitters, the one or more nodes being associated with: a network; mass data storage systems; data characteristics including at least one of: data mass, data activity, bandwidth between at least two points, or latency; data storage parameters; one or more zone indicators; and one or more Internet Protocol IP addresses, wherein the submitters are registered contributors in providing aggregated data storage evidence; identify, using the processor, a selected zone indicator received via a user interface; select, using the processor, a subset of nodes based on the selected zone indicator, wherein each of the nodes in the subset of nodes is associated with selected zone indicator; calculate, using the processor, a data gravity index score of the subset of nodes based at least in part on one or more of the selected zone indicator and data characteristics of each of the subset of nodes weighted according to a context; update the knowledge database with the calculated data gravity index score; and output, to the data gravity analytics configuration module, the calculated data gravity index score.

The data gravity analytics configuration module can automatically generate encrypted data packets that include automated recommendations for one or more data storage parameters for the one or more nodes on the network based on the calculated data gravity index score and instruct a network module to send the encrypted data packets to the one or more nodes.

The data gravity analytics configuration module can automatically generate automated recommendations or warning flags for one or more data storage parameters for the one or more nodes on the network based on the calculated data gravity index score. The automated recommendations can include at least one of the following: identify and deprioritize stale data of the one or more nodes; implement additional local network ingress or egress for the one or more nodes; adjust bandwidth for the one or more nodes; adjust latency for the one or more nodes; adjust data distribution between the one or more nodes; or adjust data capacity for the one or more nodes.

The data gravity analytics configuration module can automatically generate instructions for rendering on a user interface flagged items based on the calculated data gravity index score.

The data gravity analytics configuration module can automatically generate and push out alerts to one or more remote systems based on the calculated data gravity index score.

The data gravity analytics configuration module can automatically generate instructions to remote systems based on the calculated data gravity index score.

The data gravity index score can be calculated according to the equation: $(((data\ mass*data\ activity)^2)*bandwidth)/(latency^2)$. An index score for each of the data mass, the data activity, the bandwidth, and the latency is calculated for each of the one or more nodes based at least in part on corresponding equations for the data mass, the data activity, the bandwidth, and the latency. Alternatively, the data gravity index score can be calculated according to the equation: $(data\ mass*data\ activity*bandwidth)/(latency^2)$.

The data gravity index score can be calculated using a machine learning module configured to identify one or more patterns associated with the data characteristics of the subset of nodes.

The computer code can further cause the processor to: identify, using a machine learning model, one or more patterns associated with the data characteristics of the subset of nodes; and calculate, using the processor via the machine learning model, a predicted data gravity index score of the subset of nodes based at least in part on the one or more patterns. The predicted data gravity score can be calculated without using a formula for calculating the data gravity index score.

The computer code can further cause the processor to: receive a first updated data characteristics associated with the subset of nodes; calculate, using the processor, a first updated data gravity index score associated with the subset of nodes based at least in part on the first updated data characteristics; receive a second updated data characteristics associated with the subset of nodes; calculate, using the processor, a second updated data gravity index score associated with the subset of nodes based at least in part on the second updated data characteristics; and calculate a predicted data gravity index score based at least in part on the first updated data gravity index score and the second updated data gravity index score.

The computer code can further cause the processor to: receive one or more data storage parameters of the subset of nodes; determine one or more patterns associated with the one or more data storage parameters; request updated data characteristics of the subset of nodes based at least in part on the one or more patterns; receive the requested updated data characteristics of the subset of nodes; calculate an updated data gravity index based at least in part of the received updated data characteristics of the subset of nodes.

In another embodiment, a computer-implemented method for assessing disparate storage of data among a number of storage devices is disclosed. The method includes: receiving information about one or more nodes from a plurality of forensic source submitters, the one or more nodes being associated with: a network; mass data storage systems; data characteristics including at least one of: data mass, data activity, bandwidth, or latency; data storage parameters; one or more zone indicators; and one or more Internet Protocol IP addresses, wherein the submitters are registered contributors in providing aggregated data storage evidence; identifying a selected zone indicator received via a user interface; selecting a subset of nodes based on the selected zone indicator, wherein each of the nodes in the subset of nodes is associated with selected zone indicator; calculating a data gravity index score of the subset of nodes based at least in part on one or more of the selected zone indicator and data characteristics of each of the subset of nodes weighted according to a context; updating the knowledge database with the calculated data gravity index score; and outputting the calculated data gravity index score.

The computer-implemented method can further include: automatically generating encrypted data packets comprising automated recommendations for one or more data storage parameters for one nodes on the network based on the calculated data gravity index score and configured to instruct a network module to send the encrypted data packets to the one or more nodes.

The computer-implemented method can further include: automatically generating automated recommendations for one or more data storage parameters for one nodes on the network based on the calculated data gravity index score.

The computer-implemented method can further include: automatically generating automated warning flags for one or more data storage parameters for one nodes on the network based on the calculated data gravity index score.

The computer-implemented method can further include: automatically generating instructions for rendering on a user interface flagged items based on the calculated data gravity index score.

The computer-implemented method can further include: automatically generating and pushing out alerts to one or more remote systems based on the calculated data gravity index score.

The computer-implemented method can further include calculating the data gravity index score using the following formula: $(((data\ mass*data\ activity)^2)*bandwidth)/(latency^2)$.

The computer-implemented method can further include calculating the data gravity index score using the following formula: $(data\ mass*data\ activity*bandwidth)/(latency^2)$.

In another embodiment, a non-transitory computer storage medium storing computer-executable instructions is disclosed. When executed by a processor, the computer-executable instructions cause the processor to: receive information about one or more nodes from a plurality of forensic source submitters, the one or more nodes being associated with: a network; mass data storage systems; data characteristics including at least one of: data mass, data activity, bandwidth, or latency; data storage parameters; one or more zone indicators; and one or more Internet Protocol IP addresses, wherein the submitters are registered contributors in providing aggregated data storage evidence; identify a selected zone indicator received via a user interface; select a subset of nodes based on the selected zone indicator, wherein each of the nodes in the subset of nodes is associated with selected zone indicator; calculate a data gravity index score of the subset of nodes based at least in part on one or more of the selected zone indicator and data characteristics of each of the subset of nodes weighted according to a context; update the knowledge database with the calculated data gravity index score; and output the calculated data gravity index score.

The computer-executable instructions can further cause the processor to: automatically generate encrypted data packets comprising automated recommendations for one or more data storage parameters for one nodes on the network based on the calculated data gravity index score and configured to instruct a network module to send the encrypted data packets to the one or more nodes.

The computer-executable instructions can further cause the processor to: automatically generate automated recommendations for one or more data storage parameters for one nodes on the network based on the calculated data gravity index score.

The computer-executable instructions can further cause the processor to: automatically generate automated warning flags for one or more data storage parameters for one nodes on the network based on the calculated data gravity index score.

The computer-executable instructions can further cause the processor to: automatically generate instructions for rendering on a user interface flagged items based on the calculated data gravity index score The computer-executable instructions can further cause the processor to: automatically generate and push out alerts to one or more remote systems based on the calculated data gravity index score.

The computer-executable instructions can further cause the processor to: calculate the data gravity index score using the following formula: $(((data\ mass*data\ activity)^2)*bandwidth)/(latency^2)$.

The computer-executable instructions can further cause the processor to: calculate the data gravity index score using the following formula: $((data\ mass*data\ activity*bandwidth)/(latency^2)$.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings. The accompanying drawings, which are incorporated in, and constitute a part of, this specification, illustrate embodiments of the disclosure.

Throughout the drawings, reference numbers are re-used to indicate correspondence between referenced elements. The drawings are provided to illustrate embodiments of the subject matter described herein and not to limit the scope thereof. Specific embodiments will be described with reference to the following drawings.

DETAILED DESCRIPTION OF VARIOUS EMBODIMENTS

Figure 1A:
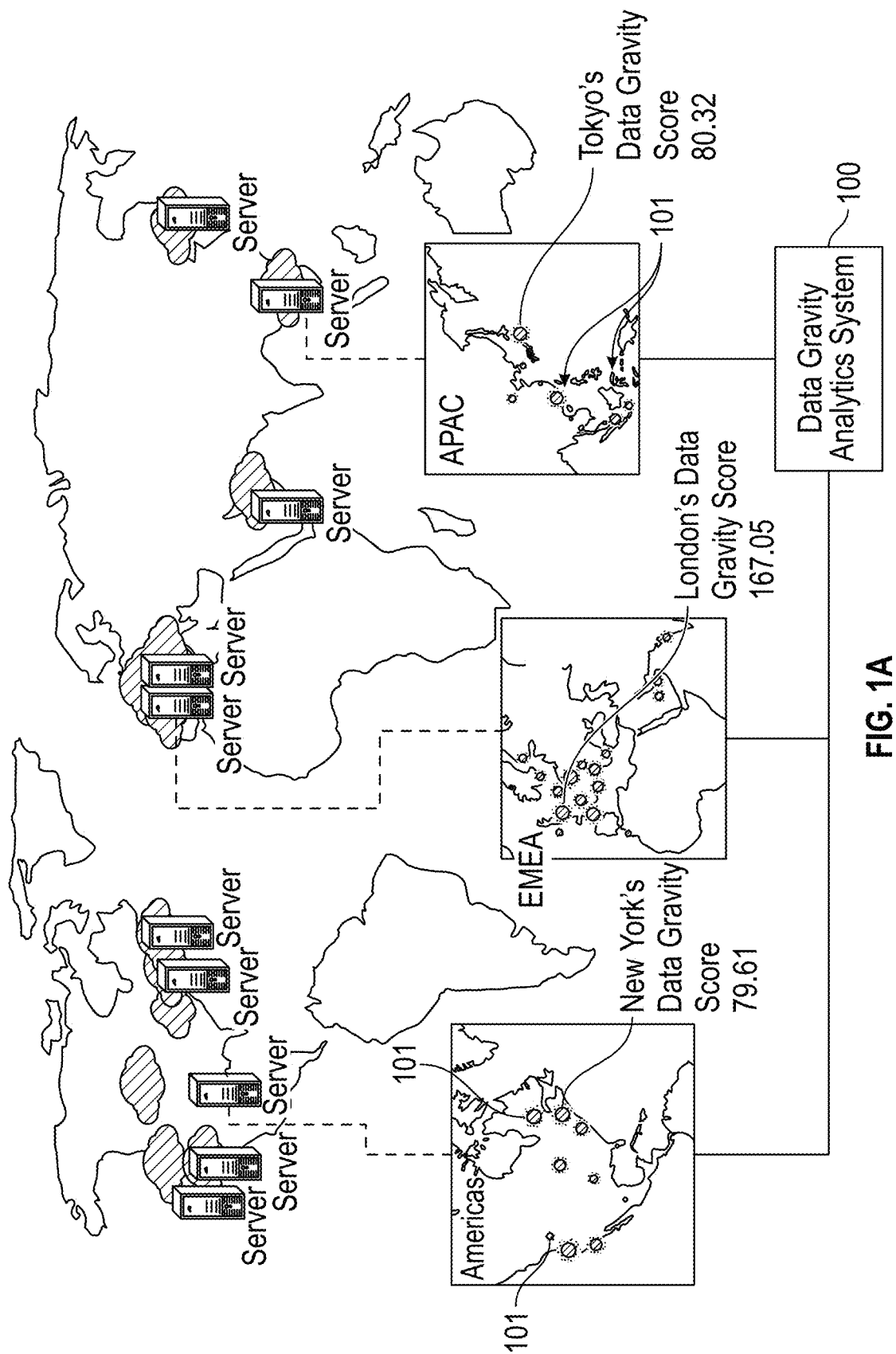
FIG. 1A is a diagram illustrating analytics provided by a data gravity analytics system.

Embodiments of the disclosure will now be described with reference to the accompanying figures. The terminology used in the description presented herein is not intended to be interpreted in any limited or restrictive manner, simply because it is being utilized in conjunction with a detailed description of embodiments of the disclosure. Furthermore, embodiments of the disclosure may include several novel features, no single one of which is solely responsible for its desirable attributes or which is essential to practicing the embodiments of the disclosure herein described. Further, for purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

As vast amounts of data are created and stored, the data is often aggregated together to bring insights and improve the process or experience. However, data is often stored at a centralized location. As more data accumulates at a centralized location, it is more likely that additional services and applications are or will be attracted to the centrally stored data. Despite continued proliferation of user devices (such as mobile communication devices, laptops, tablets, and so forth) irrespective of geographical locations, more applications and services are attracted to centrally stored or held data and, as a result, the data becomes almost impossible to move from one location to another location. This can generate barriers that can cause unfavorable complexity when factoring business locations, proximity to users, regulatory constraints, compliance, and data privacy.

As businesses go through geographic expansion, (for example, reaching new audiences, creating new channels, and participating in new digital ecosystems), it is important to build technology tools and platforms that can support and maintain data wherever they do business. These businesses should consider where they place, host, and connect data because of the challenge associated with data gravity. For business processes to execute successfully, they need to be able to bring the data together and bring the user, applications, and the networks to the data—and have access to the right technology in order to maintain that data.

Data Gravity describes the effect that as data accumulates, there is a higher likelihood that additional services or applications will be attracted to the data (referred to as "Data Gravity"). When data is generated, it is often aggregated and stored together to bring insights about the data, or the users associated with the data. As data collects, more applications and services start to use the data, and it becomes almost impossible to move the data. This barrier can be further compounded by the fact that more and more devices now generate and access data irrespective of geographical location. Data Gravity can inhibit workflow performance, raise security concerns, and increase costs for businesses. Such negative impact of data gravity can be complicated by regulatory requirements and other non-technological constraints.

In some embodiments, continuous data creation life cycle can cause and/or substantially contribute to Data Gravity. For example, increased numbers of users and end points (for example, user computing devices, such as a mobile phone, Internet of Things ("IoT") devices, sensors, and so forth) can increase the amount of data generated. The increase in the number of users and end points can lead to increased interactions and transactions between users and machines (for example, service provider servers). Data collected from different enterprises can be gathered and formatted for presentation, exchange, and compliant storage. The stored or held data, can be analyzed and/or enriched to, for example, gain competitive advantage between enterprises and can lead to further data aggregation and exchange. In some embodiments, an analytics platform can be provided to digest and provide analytics tools for these large and ever growing data sets.

FIG. 1A illustrates an example of the global distribution of a sample of data stores, shown as cloud storage systems and servers that are managed by a Data Gravity analytics system 100. The Data Gravity analytics system 100 performs analytics on the various storage systems to determine the Data Gravity of the systems. In the illustrated embodiment, analytics are segmented based on geographic regions. The intensities of the data 101 are shown via the data proxy that represents a relative indication of Data Gravity in various locations in each region.

Data Gravity Analytics System

Figure 1B:
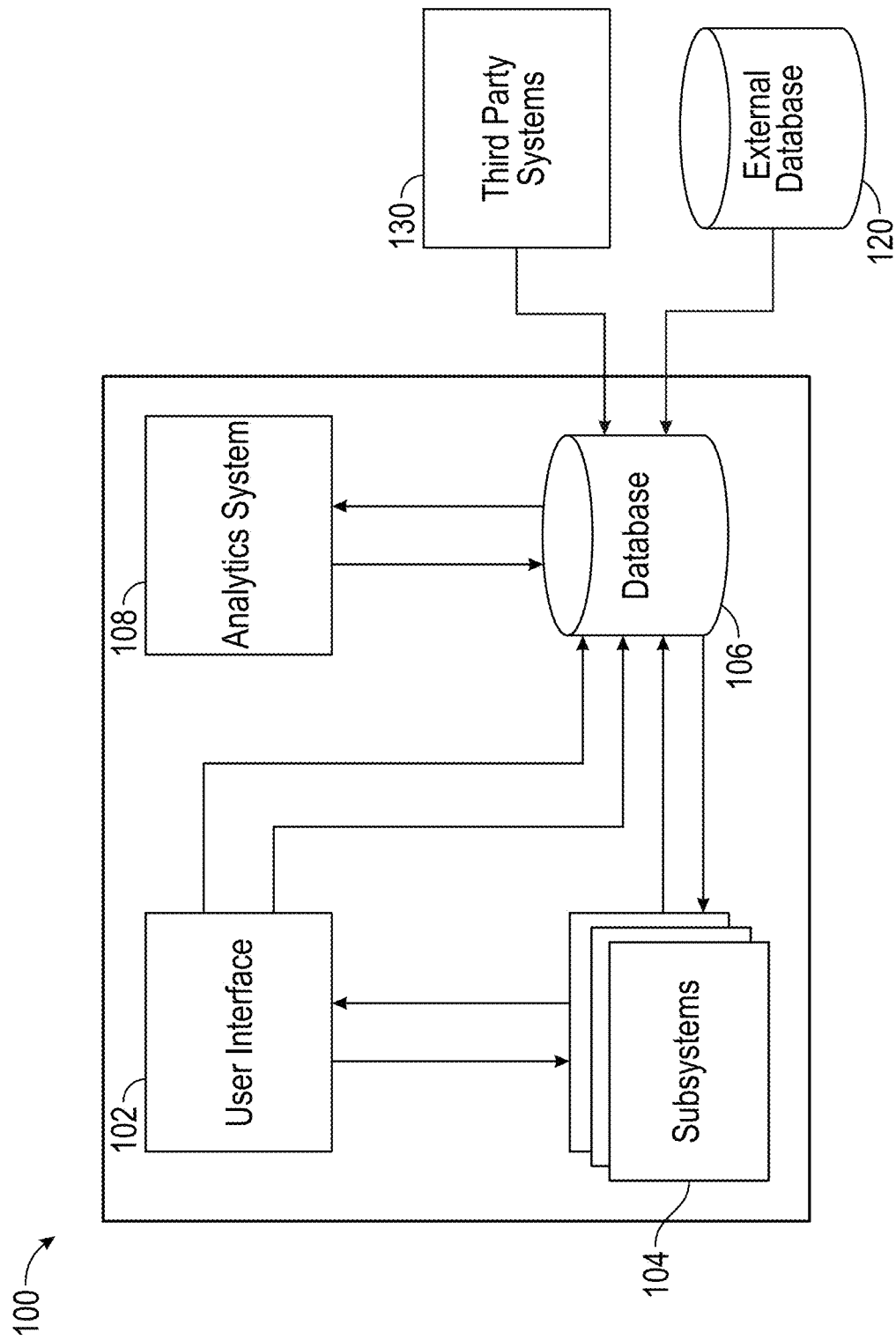
FIG. 1B is an overall system diagram illustrating one embodiment of a data gravity analytics system.

FIG. 1B illustrates an example embodiment of a Data Gravity analytics system 100. The Data Gravity analytics system 100 can include a user interface ("UI") 102, a set of subsystems or modules 104 that can perform functions including, but not limited to data ingestion, data cleansing, data linkage, report generation, and other related functionalities, a database 106, and analytics system 108. The UI 102 can receive data directly from a service, such as a report generation service or directly from the database 106. In some embodiments, the data may be collected via automated tools or forensic data collection agents or from forensic source submitters that are configured to collect and submit data to the Data Gravity analytics system 100. In some embodiments, the Data Gravity analytics system 100 can aggregate data from a diverse set of source variables related to locations and use the data to calculate a score that provides a metric of Data Gravity (referred to as "the Data Gravity index score"). The analytics system 108 can electronically communicate and send/receive data to/from, for example, the database 106, and can calculate the Data Gravity index scores.

It is recognized that in some embodiments, the Data Gravity index score may be a composite of other scores and may represent types of Data Gravity or centers of Data Gravity. The Data Gravity analytics system 100 may weigh different types of Data Gravity and provide a cumulative score similar to how it would be provided in a traditional index. As one example, a center of data mass may be a company, government, governmental body or department, data center, point of presence, group of data centers, collection of science or research facilities, or other entities, such as a metro, country, region, or collection of regions that is storing data in statistically significant or extreme quantities which would lead to a Data Gravity effect. A center of data activity may include an entity where there are a statistically significant or large number of transactions being generated or processed. For example, a top financial center in New York may be found to be a center of data activity during a time period, or a streaming service may be found to be a center of data activity when there are large volumes of users steaming data. It is recognized that the data activity could be one type of data or could be an umbrella of data types, such as, for example, data activity exchanges (for example, connectivity locations like Marseille or Amsterdam) that would then allow the data activity transactions to be categorized or segmented by type(s). In embodiments where the Data Gravity index is a composite of other centers of gravity and their respective scores, the scores can allow for ranking, differentiation, and a deeper understanding of the effects that each score has on a specific location globally.

In some embodiments, the data stored or held in the database 106 can be from one or more third party systems 130 or external database(s) 120.

The Data Gravity analytics system 100 can calculate the Data Gravity index score based on different parameters which may be set by rule-based parameters within the system and/or determined automatically by the system. For example, the Data Gravity index score may be calculated separately for metros, geographical areas, enterprises, industries, and so forth. Thus, in some embodiments, the Data Gravity analytics system 100 can calculate the Data Gravity index score between and/or provide analytic comparisons among metros, geographical areas, enterprises, industries, and so forth. The Data Gravity analytics system 100 may generate interactive, real-time visualization of such scores, comparisons, and analytics along with predictive metrics, recommended actions, and/or automated instructions for a system to take specific actions, such as performing a reallocation or migration of one or more data sets, compute or application functions/services, or reallocate networking resources.

In some embodiments, the index score can provide a relative proxy for measuring data creation, aggregation, and/or processing. The Data Gravity index score can factor in a number of attributes including, but not limited to: firmographic data (for example, industry segments, employee data, revenue data, location data, corporate entity, and so forth), technographic data (for example, information technology ("IT") spend, preferred vendors, network traffic distribution, network points-of-presence ("PoPs"), data center ("DC") PoPs, cloud PoPs, and so forth), and industry benchmarks (for example, data creation/transfer rates, latency by access method, user type, location, and application type, growth rates, cloud usage, networking services, distributed services, data technologies, end points, user devices, application use cases, and so forth). As such, the Data Gravity analytics system 100 may include components that directly communicate with one or more systems that provide the related data and metrics, such as, for example, accounting systems that house spending data, third party vendor systems, third party data vendor systems, network servers, data center servers, cloud provider servers, marketing system platforms, IoT platforms, resource management servers, customer relations servers, and so forth.

In some embodiments, the Data Gravity index score can include, and ingest related data associated with, one or more of the following variables: IT spend, co-location spend, Cloud spend, headquarters presence, business unit presence, market value, data traffic, gross domestic product ("GDP") a various levels (such as, for example city, metro, country, state, country, and region), population, number of employees, data center presence, bandwidth availability, average latencies, average traffic, peak traffic, industry presence, and the like In some embodiments, the Data Gravity index score can include, and ingest related data associated with, one or more of the following variables: total IT spend, IT storage spend, IT server spend, IT storage spend growth, IT server spend growth, IT server costs, IT storage costs, bandwidth availability, average latencies, industry presence, rate of storage consumption, rate of storage being deployed, type of storage being deployed, and the like.

In some embodiments, the Data Gravity index score can include, and ingest related data associated with, one or more of the following variables: amount of data being created by employees, amount of data being created by customers, amount of data being created by systems, amount of data being created by machines, amount of data being created by sensors, amount of data being created by devices, and the like.

In some embodiments, the Data Gravity index score can include, and ingest related data associated with, one or more of the following variables: amount of processing required for servers performing machine learning, amount of processing required for servers performing Artificial Intelligence, amount of processing required for servers performing Big Data, amount of processing required for servers performing analytics, amount of processing required for servers performing running applications, amount of processing required for servers running services (web, and so forth), and the like.

In some embodiments, the Data Gravity index score can include, and ingest related data associated with, one or more of the following variables: metro-to-metro latencies, metro-to-metro bandwidth, per capita growth between person-to-machine or person-to-device interactions, graphical processing unit ("GPU")/central processing unit ("CPU") costs, GPU/CPU floating point operations per second ("FLOPs") capacity, city or metro bandwidth growth, calculated, such as, via a compound annual growth rate ("CAGR"), city or metro bandwidth speed, city-to-city or metro-to-metro bandwidth speed, city-to-city or metro-to-metro bandwidth growth, Millions of Instructions Per Second ("MIPS"), watts, network traffic, network patterns, content delivery network traffic, content delivery network patterns, other indexes, and the like.

Data Gravity Index Score

Figure 2:
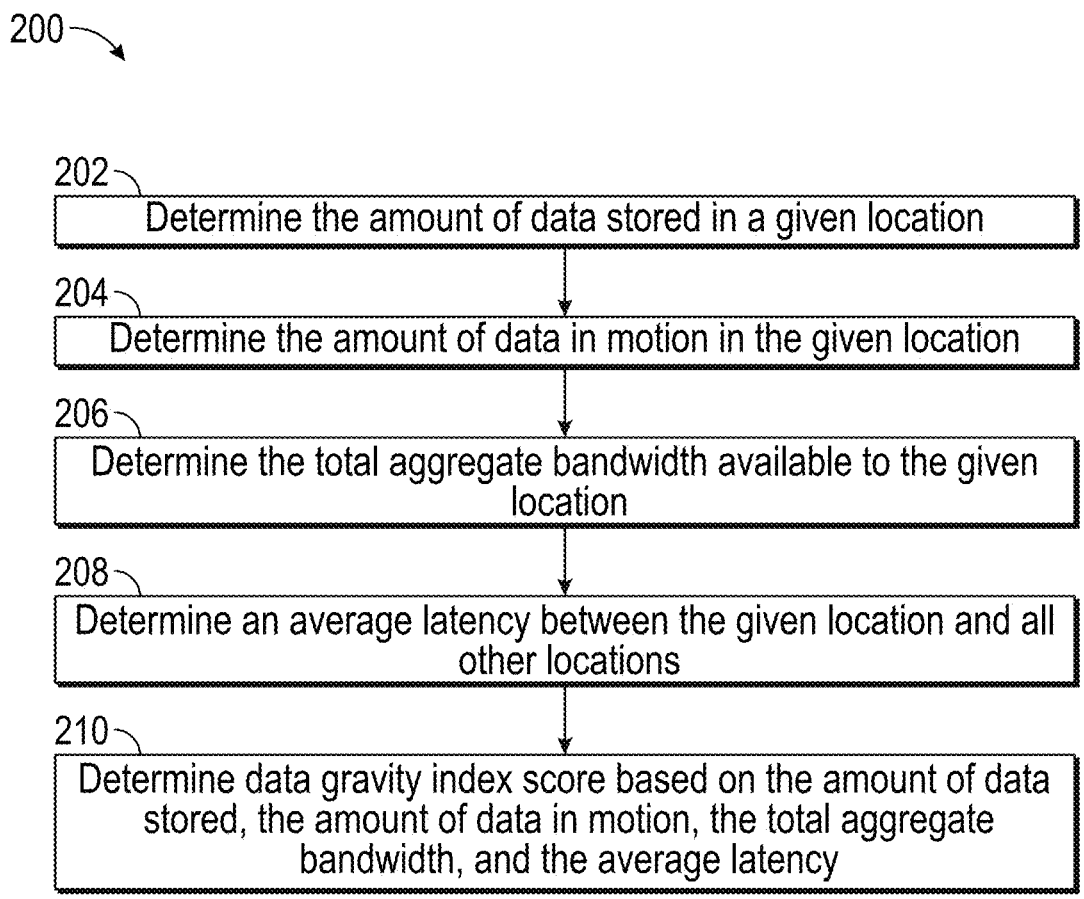
FIG. 2 is a block diagram illustrating an embodiment of a process of determining a data gravity index score.

FIG. 2 illustrates an example process for calculating a Data Gravity index score. At block 202, the amount of data stored or held in a given location is determined. The given location, as discussed herein, can be a metro (for example, Los Angeles) or a geographical region (for example, the State of California). In some embodiments, the region may be defined by or based on latitude and longitude data, such as to define regions or to determine if data falls within a metropolitan area, a locale, a street, a block, a region, a state, a county, a country, and so forth. At block 204, the amount of data in motion in the given location is determined. As discussed herein, data can be in motion when, for example, it is being transferred to one location to another or accessed by a user device. At block 206, the total aggregate bandwidth available to the given location or other network calculations is determined. For example, average network traffic data or peak traffic data over a period of time may be used as the calculations. The period of time can be any time period desired from sub-second (milliseconds, microseconds, nanoseconds for example) or longer (seconds, minutes, hours, days, weeks, months, quarters, years, decades, etc.). It is also recognized that more than one network calculation may be used. At block 208, an average latency between the given location and all other locations is determined. For example, the amount of data and bandwidth data may be determined based on the automated collection of or reporting metrics from third party systems, specific analytics run on servers or systems that store or process data, as well as from third party systems that provide updated sources of such data sets. The Data Gravity analytics system 100 may include one more application programming interfaces ("API") and/or may communicate with one more third party APIs to securely collect data and other related information.

At block 210, a Data Gravity index score is determined based on the amount of data stored at the given location, the amount of data in motion in the given location, the total aggregate bandwidth available to the given location, and the average latency between the given location and all other locations. In some embodiments, a Data Gravity index score can be calculated using the following formula:

$$\text{Data Gravity} = (DM * DA * BW)/L^2$$

where DM is Data Mass, DA is Data Activity, BW is bandwidth, and L is latency. Data Mass can represent the amount data that is stored or held at a given location. Data Activity can represent data that is in motion (for example, interactions or movement). In some embodiments, Data Activity can be an amplifier of Data Mass. Bandwidth can be the total aggregate bandwidth available at a given location. In some embodiments, bandwidth is a multiplier in calculating Data Gravity because, for example, higher bandwidth can represent more potential due to more traffic and utilization (for example, for attracting more services and applications) and lower bandwidth can represent less potential. Latency can be the average latency between a given location and all other locations. In some embodiments, latency is an inhibitor to Data Gravity since higher latency can represent less potential (for example, for attracting more services and applications) and lower latency can represent more potential. For example, a higher Data Gravity index score can reflect greater gravitational force of enterprise data growth in a given area, whereas lower Data Gravity index score can reflect less gravitational force. Moreover, latency may be at the speed of light, at the speed through solid or hollow core fiber optic cable, measured latency, or round trip time latency over a network.

In some embodiments, the Data Mass ("DM"), Data Activity ("DA"), and bandwidth (BW) can be measured as a rate. For example, the Data Mass ("DM"), Data Activity ("DA), and bandwidth ("BW") can be measured in kilobytes per second, megabytes per second, gigabytes per second, terabytes per second, petabytes per second, exabytes per second, and the like. Other measurements associated with, for example, data transfer, may be used for calculating the Data Gravity index score. In some embodiments, latency is measured in milliseconds. However, other measures including, but not limited to, nanoseconds, microseconds, centiseconds, deciseconds, and the like may be used to quantify latency.

It is recognized that the Data Gravity index score may be calculated using other formulas and/or may be selected based on controlling factors. For example, the Data Gravity index score can be calculated using the following formula:

$$\text{Data Gravity} = ((DM * DA)^2 * BW)/L^2$$

As additional examples, the Data Gravity index score may be calculated using one of the following formulas:

$$\text{Data Gravity} = (DM * DA * AT)/L^2$$

$$\text{Data Gravity} = ((DM * DA)^2 * AT)/L^2$$

where AT represents average traffic, peak traffic, or average bandwidth.

Other formulas (for example, based on a combination of variables described herein) for calculating the Data Gravity index can include, but are not limited to:

$$\text{Data Gravity} = (DM * (DA^2)) * AT)/L^2$$

$$\text{Data Gravity} = DM/L^2$$

$$\text{Data Gravity} = DA/L^2$$

$$\text{Data Gravity} = AT/L^2$$

$$\text{Data Gravity} = DA * AT/L^2$$

$$\text{Data Gravity} = DM * AT/L^2$$

$$\text{Data Gravity} = DA^2/L$$

$$\text{Data Gravity} = DM^2/L$$

$$\text{Data Gravity} = AT^2/L$$

It is also recognized that in some embodiments, the Data Gravity index score may apply different formulas to different segments and/or may combine one more formulas. In some embodiments, different formula variations may be applied depending on the specific Data Gravity type being calculated.

In some embodiments, various types of rate limiting, influencing, and/or controlling variables can be added to systems, methods, and equations discussed herein to allow different variations of Data Gravity index score calculations. As discussed further below, the Data Gravity index score calculations can be used with growth rates to perform forecasting or predictions.

In some embodiments, the Data Gravity analytics system 100 can calculate a metro Data Gravity Intensity Score, which represents the Data Gravity intensity of a given metro (for example, London). In some embodiments, geographic coordinates, labels, zip codes, or other data sources can be used to determine geographic boundaries and/or to filter data sets to focus on those sets that fall within the boundaries.

In some embodiments, the Data Gravity analytics system 100 can calculate a metro to metro Data Gravity index score, which represents the Data Gravity intensity between two metros (for example, between Los Angeles and New York City).

In some embodiments, the Data Gravity analytics system 100 can calculate an industry metro Data Gravity index score, which represents the Data Gravity intensity of a particular industry (for example, computer and electronic product manufacturing) for a metro (for example, Silicon Valley).

In some embodiments, the Data Gravity analytics system 100 can calculate a metro enterprise Data Gravity index score, which represents Data Gravity intensity of a specific enterprise (for example, Walmart or Coca Cola) in a metro (for example, Atlanta or Research Triangle).

The Data Gravity analytics system 100 can provide automated tools for the calculation, exploration, planning, and reporting of Data Gravity index scores. The calculation, exploration, planning, and reporting of Data Gravity index scores can be done through electronic selection or viewing of one or more features provided the UI and the data for calculating the Data Gravity index scores can be stored or held, for example, in one or more databases 106 of the Data Gravity analytics system 100. As discussed herein, the subsystems or modules 104 of the Data Gravity analytics system 100 can assist in the importing/loading and transforming/cleansing/curation of the data as it is ingested into the system 100. Once ingested, the data can be processed by other subsystems or modules 104 (for example, performing analytics) to assist in calculating the Data Gravity index scores. In some embodiments, the Data Gravity index scores can be made available post-processing or simultaneously for generating reports and the like.

In some embodiments, the Data Gravity index scores can be visualized to provide further insight. For example, the Data Gravity index scores can be represented as dots on a map, where the size of the dots represent the Data Gravity index scores associated with different regions or metros (for example, larger dots indicate greater Data Gravity intensity).

Current backhaul architectures cannot address, for example, the following limitations/difficulties associated with Data Gravity: (1) limited exchange of data across multiple internal and/or external platforms, (2) maintaining local data copies for data compliance, and (3) limited concurrent multi-data set analytics in a performant manner at global points of presence. As such, in some embodiments, the Data Gravity analytics system 100 may provide technology that overcomes one or more of those limitations/difficulties.

Pervasive Data Center Architecture

Figure 3A:
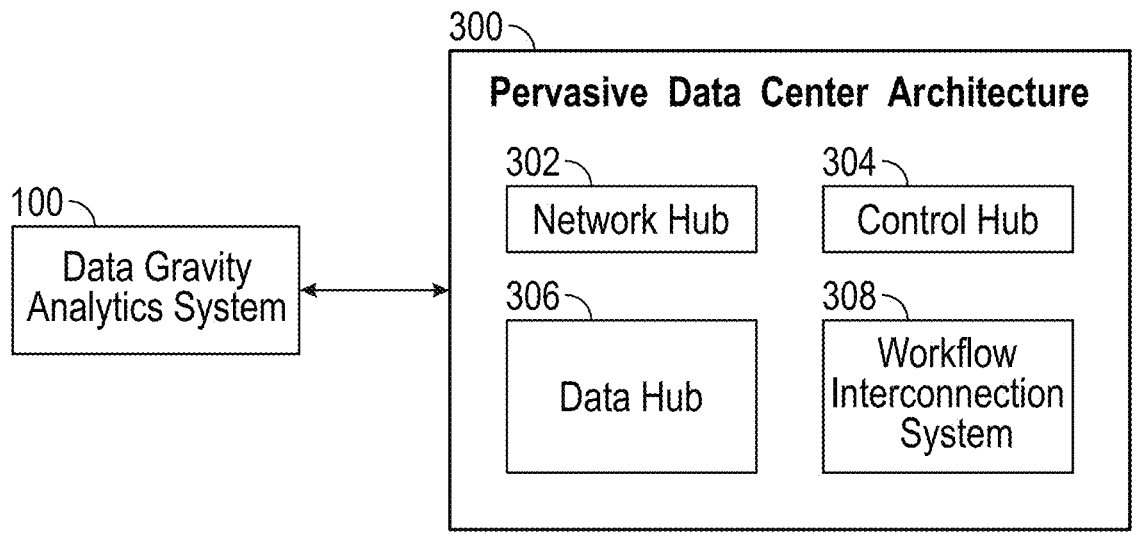
FIG. 3A is an overall system diagram illustrating an embodiment of a pervasive data center architecture.

FIG. 3A illustrates an embodiment of a pervasive data center architecture 300. In some embodiments, the pervasive data center architecture 300 can address the issues caused by Data Gravity by, for example, providing a connected community approach between enterprises, connectivity, and cloud and content providers. For example, the pervasive data center architecture 300 can integrate core (for example, data lake), cloud (for example, data archival), and edge (for example, data ingest) at centers of data exchange. In another example, the pervasive data center architecture 300 can implement a secure, hybrid IT and data-centric architecture globally at points of business presence. In some embodiments, the pervasive data center architecture 300 can collect data that is used by the Data Gravity analytics system 100 to determine a Data Gravity index score.

In some embodiments, the pervasive data center architecture 300 can remove barriers associated with Data Gravity by, for example, providing tools and technology that is able to invert traffic flow and bring users, networks, and clouds to, for example, privately hosted enterprise data. In other words, the pervasive data center architecture 300 can, for example, put data at the center of the architecture and leverage interconnection between users and bringing clouds and users to the data. In doing so, the pervasive data center architecture 300 can provide enterprises and service providers secure, neutral meeting places to host their infrastructures that are proximate yet separate from each other. In some embodiments, the pervasive data center architecture 300 can be a multi-tenant datacenter platform.

In some embodiments, the pervasive data center architecture 300 can, for example, reduce risk for enterprises by allowing more secure data exchange. Optionally, the pervasive data center architecture 300 can, for example, lower costs associated with bandwidth (for example, maintaining or increasing bandwidth) and infrastructure (for example, maintaining duplicative infrastructure). Optionally, the pervasive data center architecture 300 can, for example, increase revenue for enterprises by allowing unbounded (for example, geographically) data analytic performance. Further, such analytics can be partitioned or siloed (for example, physically or virtually) so that analytic and/or data from a specific client or under specific permissions is not shared with other clients or outside of the permitted permissions.

In the example embodiment shown in FIG. 3A, the pervasive data center architecture 300 is in electronic communication with the data gravity analytics system 100 which receives information about the various data centers and then generates a Data Gravity index score. The pervasive data center architecture 300 can also include a network hub 302, a control hub 304, a data hub 306, and a workflow interconnection system 308. The network hub 302 can consolidate or localize traffic into ingress/egress points to optimize or improve network performance. In some embodiments, the network hub 302 facilitates the exchange of information between the user side and the host side. On the user side, the network hub 302 may have access to mobile backhauls, virtual private network ("VPN") terminals, Internet of Things ("IOT") gateways, and internet drain. Mobile backhauls may include the transport network that connects the core network and a radio access network of the mobile network. A VPN allows users to establish a secure connection over non-secure internet extending a private network such that users are able to send and receive data as if the devices were directly connected to the private network. An IOT gateway includes systems that connect IoT devices, equipment systems, sensors, and the cloud. An internet drain is the point that users leave the private network of their internet service provider and access routers from other networks. On the host or service provider side, the network hub 302 may connect via multiprotocol label switching ("MPLS") links, carrier ethernet, data center, and cloud interconnects. In this way, the network hub 203 may consolidate and localizes traffic into ingress/egress points to increase or optimize network performance and reduce cost. MPLS is a private connection linking data centers and branch offices, which is typically managed by service providers who purport to provide certain network performance, quality, and availability. Carrier ethernet is an application of ethernet technology that allows network providers to offer ethernet services to their customers and to use ethernet technology. Data centers and cloud interconnects may be operated by third-party service providers.

The data hub 306 can localize data aggregation, staging, analytics, streaming, and data management to optimize or improve data. In some embodiments, the data collected and processed at the network hub 302 are delivered to the data hub 306 for further operations. For example, unstructured data may be stored in a data lake. Some data may be stored in high performance computing clusters that include nodes that work in parallel to increase processing speed. Other data may be streamed and analyzed through an integration process that collects data (after computational storage) from different sources into structured datasets and stored in a centralized data warehouse.

The control hub 304 can host adjacent security and IT controls to, for example, improve security posture and IT operations. In some embodiments, the data from the data hub 306 is then delivered to the control hub 306 where the data may be subject to IT operations or security controls.

The IT operations may include administrative processes such as, for example, monitoring, logging, virtualizing, and managing of the structured data. The security controls may include management security, operational security (operational applications), and physical security (infrastructures). Here data center infrastructure management ("DCIM") software and portals may be used to assist with the controls to improve the security of the data.

The workflow interconnection system 308 can add a software-defined-network ("SDN") overlay to service change multi-cloud and business-to-business ("B2B") application ecosystems. The workflow interconnection system 308 can connect hubs across metros (for example, New York City, Los Angeles, and Seoul) and regions (for example, North America, Europe, Southeast Asia, and so forth) to enable secure and performant distributed workflows. Optionally, the workflow interconnection system 308 can enable virtual interconnection matched to or catered to business need based on type, speed, destination, time of day, or ecosystem participant. In some embodiments, the workflow interconnection system 308 can be SX Fabric on PlatformDIGITAL® of Digital Realty. The workflow interconnection system 308 may support a variety of digital services, including, for example, software-as-a-service ("SaaS"), platform-as a service ("PaaS"), infrastructure-as a service ("IaaS"), and location-as-a-service ("LaaS"). SaaS includes a delivery model in which software is licensed on a subscription basis and is centrally hosted by the provider or on the provider's behalf. PaaS is a type of cloud computing offering in which a service provider delivers a platform to clients, enabling them to develop, run, and manage business applications without the need to build and maintain the infrastructure such software development processes typically require. IaaS includes online services that provide APIs used to access components of the underlying network infrastructure that can be offered to clients on demand such that the resources of the infrastructure are owned by the service provider. LaaS is a location data delivery model where privacy protected physical location data acquired through multiple sources including carriers, Wi-Fi, IP addresses and landlines is available to enterprise customers through an API. The workflow interconnection system 308 may be used to service chain multi-cloud and B2B application ecosystems and connect hubs across metros and regions to enable secure and performant distributed workflows.

In some embodiments, the network hub 302, the control hub 304, the data hub 306, and the workflow interconnection system 308 work collectively to function as a whole under the pervasive datacenter architecture 300. The network hub 302 may be connected directly to the workflow interconnection system 308 to provide provisioned virtual interaction matched to business needs based on type, speed, destination, time of day or ecosystem participant. The data hub is 306 may be connected to the network hub 302 so that the network hub 302 inputs data at rest to data hub 306 and data hub 306 outputs data in motion back to network hub 302 for further operations. The control hub 304 may be connected to the network hub 302 for policy inspection and enforcement.

Figure 3B:
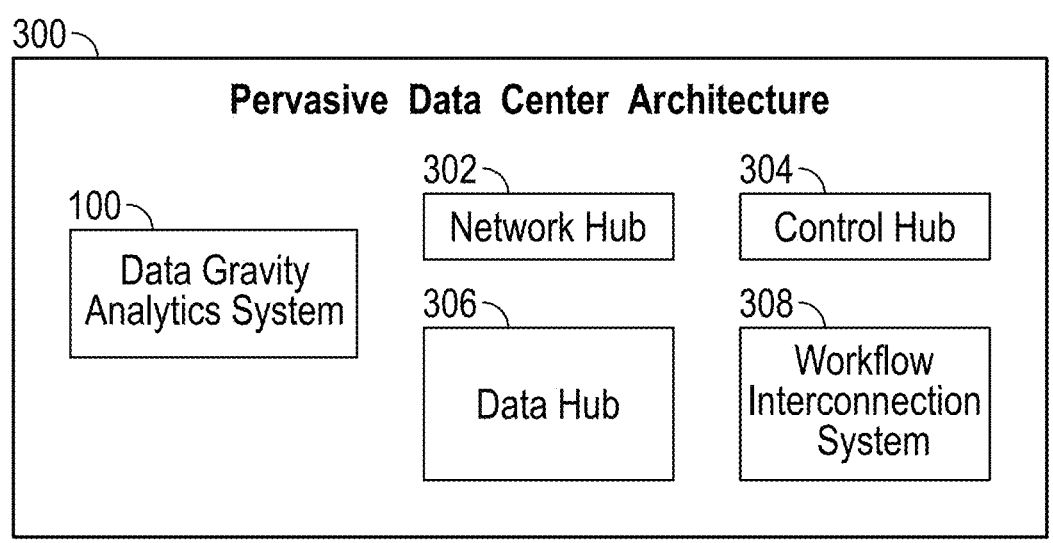
FIG. 3B is an overall system diagram illustrating another embodiment of a pervasive data center architecture.

FIG. 3B illustrates another embodiment of the pervasive data center architecture 300 that includes the data gravity analytics system 100.

In some embodiments, the pervasive data center architecture 300 can recommend data ingestion techniques. These recommendations may be automated and based on one or more factors, such as, for example, data type, staleness of data, amount of data, location of data, and so forth. In some embodiments, machine learning may be used to provide predictive analytics that indicates recommendations on how such data may be ingested and/or stored. Machine learning may include artificial intelligence such as neural networks, genetic algorithms, clustering, or the like.

In some embodiments, the pervasive data center architecture 300 can facilitate data rotation (for example, archiving, downgrading, or deprioritization) of stale data. By monitoring and tracking data access and exchange history, the pervasive data center architecture 300 can, for example, identify stale data that is no longer up-to-date or outdated. Once stale data is identified, the pervasive data center architecture 300 can, for example, deprioritize the stale data to limit or reduce the amount of expended resources associated with, for example, maintaining hard copies of the stale data for legal compliance, transferring the stale data to another location for facilitating user access, and so forth. Automated tools, such as scripts, backend process, data migration processes, may be used to update, filter, stored, migrated, and/or delete stale data.

In some embodiments, the pervasive data center architecture 300 can rationalize existing IT portfolio by, for example, consolidating legacy data centers, instituting new regional IT hosting zones, and standardizing infrastructure deployments. In doing so, the pervasive data center can advantageously, for example, improve speed to deploy distributed IT, reduce the number of data center vendors, and implement flexible infrastructure.

In some embodiments, the pervasive data center architecture 300 can rewire the network by, for example, implementing local network ingress/egress, optimizing/improving network segment/topology, and instantiating multi-cloud connectivity. In doing so, the pervasive data center 300 can advantageously, for example, reduce latency and increase throughput, increase bandwidth per employee, provide performant multi-cloud connectivity, and improve global traffic management. In some embodiments the pervasive data center architecture 300 can automatically generate and instruct other components (internal or external) to implement changes in response to the analytics provided by the Data Gravity analytics system 100.

In some embodiments, the pervasive data center architecture 300 can implement hybrid IP controls by, for example, implementing ingress/egress control points, hosting IT and security stacks at ingress/egress points, and simplifying infrastructure management. In doing so, the pervasive data center can 300 advantageously, for example, reduce IT vulnerability points, improve security posture, reduce operational complexity, and provide secure, direct connect SaaS based security and operational services.

In some embodiments, the pervasive data center architecture 300 can optimize or improve data exchange by, for example, implementing data staging/aggregation, integrating public/private data sources, and hosting data and analytics adjacent to network ingress/egress points. In doing so, the pervasive data center 300 can advantageously, for example, optimize or improve data exchange between users, things, networks, and clouds, maintain data compliance and sovereignty, enable real-time intelligence across workflows, and solve data gravity challenges.

In some embodiments, the pervasive data center architecture 300 can interconnect global workflows by, for example, service-chain multi-cloud and B2B applications, cross-connect inter-metro and inter-region hubs, and directly connect digital ecosystems locally and globally. In doing so, the pervasive data center 300 can advantageously, for example, enable SDN-based interconnection, dynamically connect workflow participants and services, securely integrate digital ecosystems globally, and enable secure B2B workflow collaboration.

In some embodiments, the pervasive data center architecture 300 can include tools for understanding and complying with regulatory compliance, security, privacy, import/export rules from different jurisdictions (for example, states and countries). For example, the pervasive data center architecture 300 may include one or more rules-based systems that stores rules pertaining to different jurisdictions and/or effective time periods and then overlay those rules on the data and analytics to generate recommendations or instruction packages on how to re-allocate or update the data. In some embodiments, the pervasive data center architecture 300 may include a service that provides automated recommendation reports delivered to the customer based on Data Gravity index changes over time. For example, recommendations may include one or more of the following based on the Data Gravity index numbers: increase capacity in X region, increase capacity in Y metro, reroute data from X region to Y region, increase bandwidth or add redundant routes between Y metro and Z metro, create a new route from Y metro to Z metro, change security controls in Z metro, rebalance data stored between X region and B region.

In some embodiments, the pervasive data center architecture 300 can generate and provide Data Gravity index score forecasts based on historical data. The forecasts can be used to provide recommendations to users (for example, enterprises) based on, for example, anticipated growth areas (for example, regions, metros, or countries where data is rapidly accumulating). The forecasts may include various industry forecasts, such, as, for example, forecasted increase in data gravity for different industries like banking and financial services, pharmaceutical, mining & natural resources, and so forth.

In some embodiments, factors such as growth rates (for example, economy growth rates, company growth rates, or industry growth rates), year-to-year growth ("YoY Growth") index, CAGR, and others described herein can be used to forecast or predict changes in the Data Gravity index score for a region, a country, a city, or a geographical area over a period of time (for example, a week, a month, a year, a decade, and the like). The data used for the prediction or forecast can be provided by third-party systems (for example, databases or servers). As described herein, such forecast or predictions can drive business decisions in, for example, expanding into another city or region, building more or maintaining current capacity in view of forecasted demand, increase or decrease workforce, and the like.

In some embodiments, machine learning, pattern recognition, and examination, or other methods may be used to forecast or predict changes in the Data Gravity index score. Machine learning may be used in with or without Data Gravity index formulas described herein to forecast or predict changes in the Data Gravity index score. In some embodiments, the pervasive data center architecture 300 can generate and run simulations using the Data Gravity index to assist with planning and projections (such as, for example, what if analyses). These simulations may include, for example, impact analyses (for example, failure X occurred, and these were the effects) as well as remediations (for example, based on impact analyses, providing recommended changes to one or more features like the network, the exchange, and so forth) along with the expected effect of such changes.

Figure 3C:
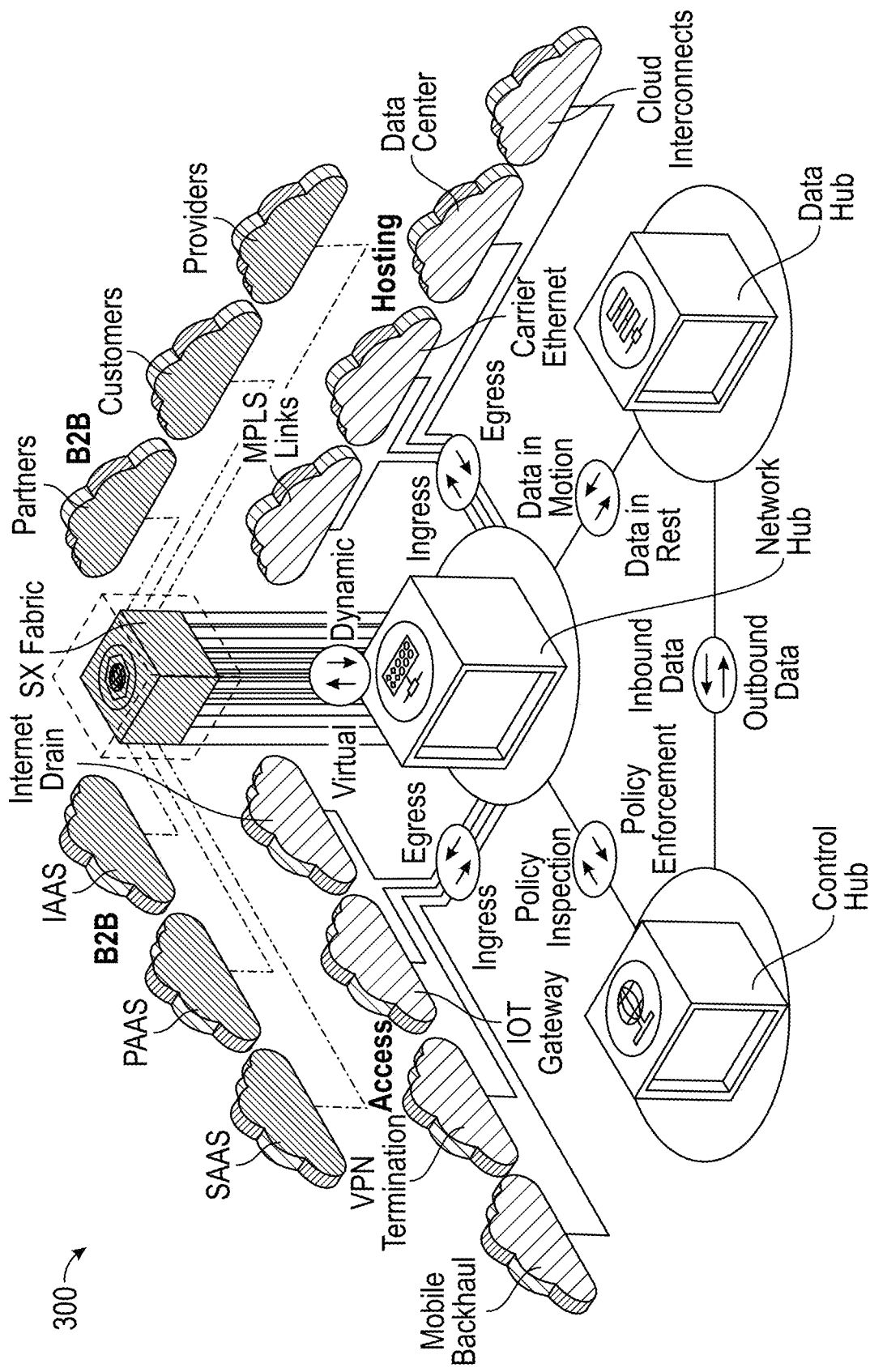
FIG. 3C is an overall system diagram illustrating another embodiment of a pervasive data center architecture.
Figure 3D:
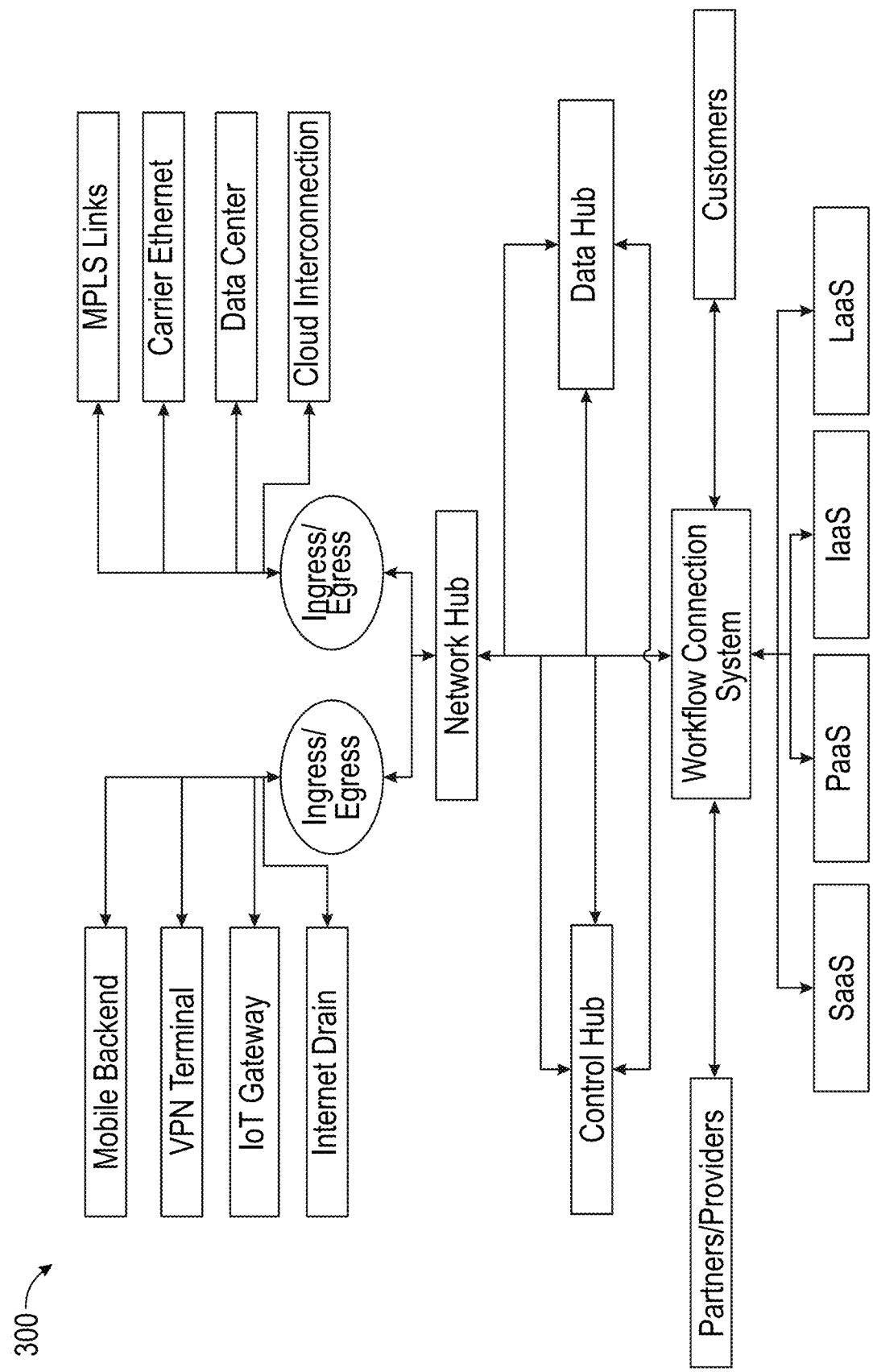
FIG. 3D is an overall system diagram illustrating another embodiment of a pervasive data center architecture.

FIG. 3C and FIG. 3D illustrate other embodiments of the pervasive data center architecture 300 that includes the data gravity analytics system 100.

In some embodiments, the Data Gravity analytics system 100 and/or the pervasive data center architecture 300 can electronically communicate with other systems or components such as user interface dashboards, mobile applications, third party platforms, and other applications. The electronic communications may be via a direct connects, a wireless connection, or API calls. For example, the Data Gravity analytics system 100 and/or the pervasive data center architecture 300 may electronically communicate with or include an artificial intelligence or machine learning system or rules engine. Various data items may be cleansed, segmented, and/or anonymized to perform correlative analytics and/or machine learning on the data to provide predictive analytics or to recommend decisions. The electronic communications may be via monolithic services, microservices, or serverless technologies.

In some embodiments, the Data Gravity analytics system 100 may apply machine learning to look at forensic data sources or other data sources to then supply data for computation with or without the Data Gravity formula. Also, the Data Gravity analytics system 100 may apply machine learning to look for patterns within Data Gravity Indexes or sub-types or indexes to create new predictions. Further, the Data Gravity analytics system 100 may look at forecasting and predictions derived from Data Gravity information.

In some embodiments, the Data Gravity analytics system 100 may trigger or initiate processing or other allocations or automations that are kicked off or initiated by the results of the Data Gravity index score. Also, Data Gravity analytics system 100 may automatically initiate or start workflows by the Data Gravity analytics system 100 or machine learning looking at the Data Gravity index scores and other variables. In some embodiments, the Data Gravity analytics system 100 may look at a workflow and pull data from that workflow (such as, for example, a provisioning workflow or deployment) and use that data to create an update to the Data Gravity index. In some embodiments, the Data Gravity analytics system 100 may look at optimization options as discussed herein in some of the modeling or assessments of using Data Gravity indices with the Data Gravity analytics system 100 or systems such as PlatformDIGITAL® of Digital Realty.

Example User Interface

Figure 4:
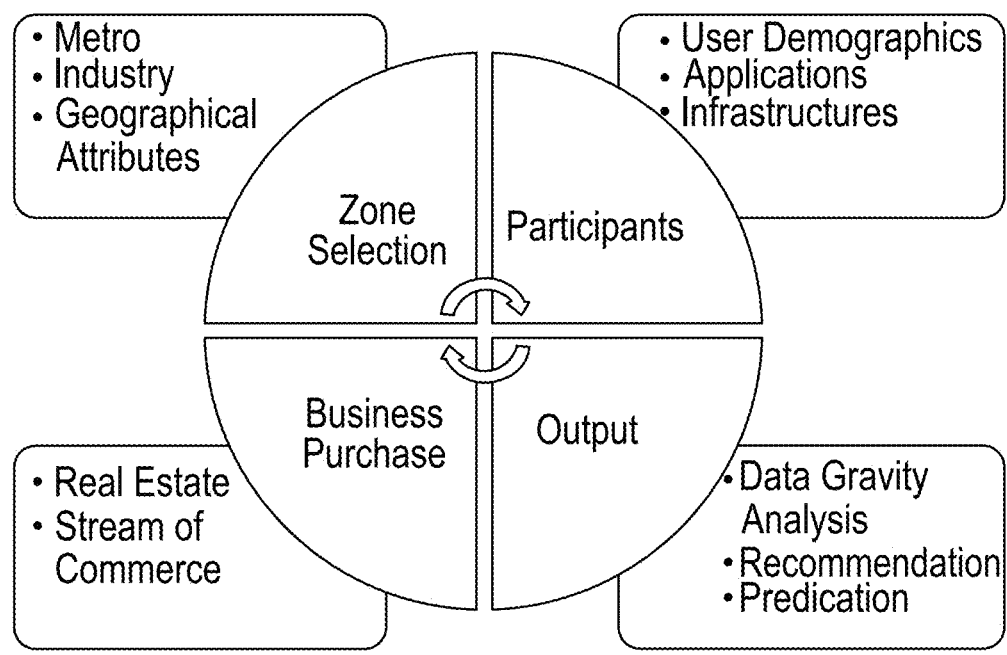
FIG. 4 is a diagram illustrating one embodiment of user interface components.

FIG. 4 illustrates one embodiment of user interface features that maybe available in a UI 102 of the Data Gravity analytics system 100 and/or the pervasive data center architecture 300. The UI 102 may provide controls that allow the user to select one or more zones, such as, for example, the metro, the industry, or geographic attributes. The UI 102 may provide controls that allow the user to select specific participants, such as, for example, user demographics, applications, or infrastructures. The UI 102 may provide controls allow the user to select a specific business purpose, such as, for example, real estate review or stream of commerce analysis. The UI 102 may also include controls that allow the user to select and/or control the output, such as, for example, a Data Gravity analysis, a set of automated recommendations, a set of predictions, and so forth.

Example Segmentation/Filtering

In some embodiments, the Data Gravity analytics system 100 and/or the pervasive data center architecture 300 may be used with a variety of platforms to ingest and analyze terabytes, petabytes, or even exabytes of data and attributes, such as from Global 2000 Enterprise companies' presences in different regions with specific variables for each metro. For example, the objective of one analysis may be potential business expansion as to the finance industry, such that the Data Gravity analytics system 100 and/or the pervasive data center architecture 300 may segment the data into specific industries and apply the analytics only to data pertinent to banks and accounting firms in London. In other instances, the objectives may be to analyze potentially business expansion as to the healthcare industry, such that the Data Gravity analytics system 100 and/or the pervasive data center architecture 300 may apply a different segmentation or filtering of the into specific industries and apply the analytics only to data pertinent to hospitals, long term care centers, pharmaceutical companies, and medical providers in London. As another example, the analysis may be focused on the data of all Global 2000 Enterprise digital media companies' presences in in Central America such that the Data Gravity analytics system 100 and/or the pervasive data center architecture 300 may segment the data to apply the analytics only to data pertinent to digital media companies in Panama, Costa Rica, Nicaragua, Honduras, El Salvador, Guatemala, and Belize. As a further example, the analysis may be based on the data of a specific company in all regions such that the Data Gravity analytics system 100 and/or the pervasive data center architecture 300 may segment the data into apply the analytics only to data pertinent to that specific company across all countries.

Composite Analyses

In some embodiments, the Data Gravity analytics system 100 and/or the pervasive data center architecture 300 may be used to analyze larger areas and groups of areas. For example, the Data Gravity analytics system 100 and/or the pervasive data center architecture 300 may generate a Data Gravity index for a certain zone and compare that with Data Gravity indices for other zones. For example, a Data Gravity index for London may be analyzed together with a Data Gravity index for Amsterdam and a Data Gravity index for Paris. The Data Gravity analytics system 100 and/or the pervasive data center architecture 300 may generate a composite Data Gravity index that includes the indices for London, Amsterdam, and Paris.

The Data Gravity analytics system 100 and/or the pervasive data center architecture 300 may analyze Data Gravity from a global perspective to flag potential areas of concern and provide recommendations based on predicted growth areas. For example, artificial intelligence and machine learning may be used to build models for predicting the growth areas and can be trained using data, such as, for example, data creation rates, storage capacity, processing capacity, industry growth, cloud usage changes, population growth, and annual rate of deployment of enterprise storage (hard disk drive, solid state drive, and tape storage) for on premise, service-chain, multi-cloud, and B2B applications. Optionally, the Data Gravity analytics system 100 and/or the pervasive data center architecture 300 may also forecast the intensity and gravitational force of enterprise data growth in various regions as a proxy for measuring expected data creation, aggregation, and processing.

Example Use Case—Resource Allocation Planning and Execution

As one example use case, the Data Gravity analytics system 100 and/or the pervasive data center architecture 300 may be used to make adjustments to a conglomerate's data storage plan in view of plans to expand the business in London. The data used may include GDP, population, number of employees, technographics, network data related to the infrastructure, IT spend data, research, development costs, industry forecasts, forecasted company growth, and expected employee locations and may include data from all Global 2000 Enterprise companies' presences in London, such as the British Petroleum Company plc, HSBC, Prudential plc, Legal & General Group, Aviva, and so forth. It may also consider a competitor or similar company in an adjacent industry or look at an industry average or best practice to consider each of the above data points.

The Data Gravity analytics system 100 and/or the pervasive data center architecture 300 may include electronic tools for segmenting or filtering the data, such as, for example, to a specific industry, which in this example is the finance sector. Other types of attributes, for example, geographical sub-regions, may also be used to segment of filter the data.

The Data Gravity analytics system 100 and/or the pervasive data center architecture 300 may analyze the data to determine a Data Gravity index using one or more of the formulas above. Different formula variations may be used to calculate different types of the Data Gravity index. For example, the following equation may be used if bandwidth is not being considered.

$$\text{Data Gravity} = (\text{data mass} * \text{data activity})/\text{latency}^2$$

The Data Gravity analytics system 100 and/or the pervasive data center architecture 300 can automatically generate customized recommendations for allocating of resources to support business expansion, such as, for example, recommended data storage footprints that consider the expected Data Gravity index as well as the business's needs, workflow profiles, and workload attributes, and expected interconnections of employees. For example, predictions for the expansion may also be provided to determine what the expected future data loads will be, understand the network capacity and storage parameters of the region (for example, regions for potential business expansion). These predictions can be used to provide the recommendations on how much growth can be supported, where the growth is best made, and/or what changes need to be made to increase capacity if needed.

Based on the recommendations, the Data Gravity analytics system 100 and/or the pervasive data center architecture 300 may select specific companies, data centers, and application servers that are permitted to participate in the determined zones based on the recommended allocations. In some embodiments, the parameters may be automatically selected and implemented using the pervasive data center architecture 300 or other systems.

Figure 5:
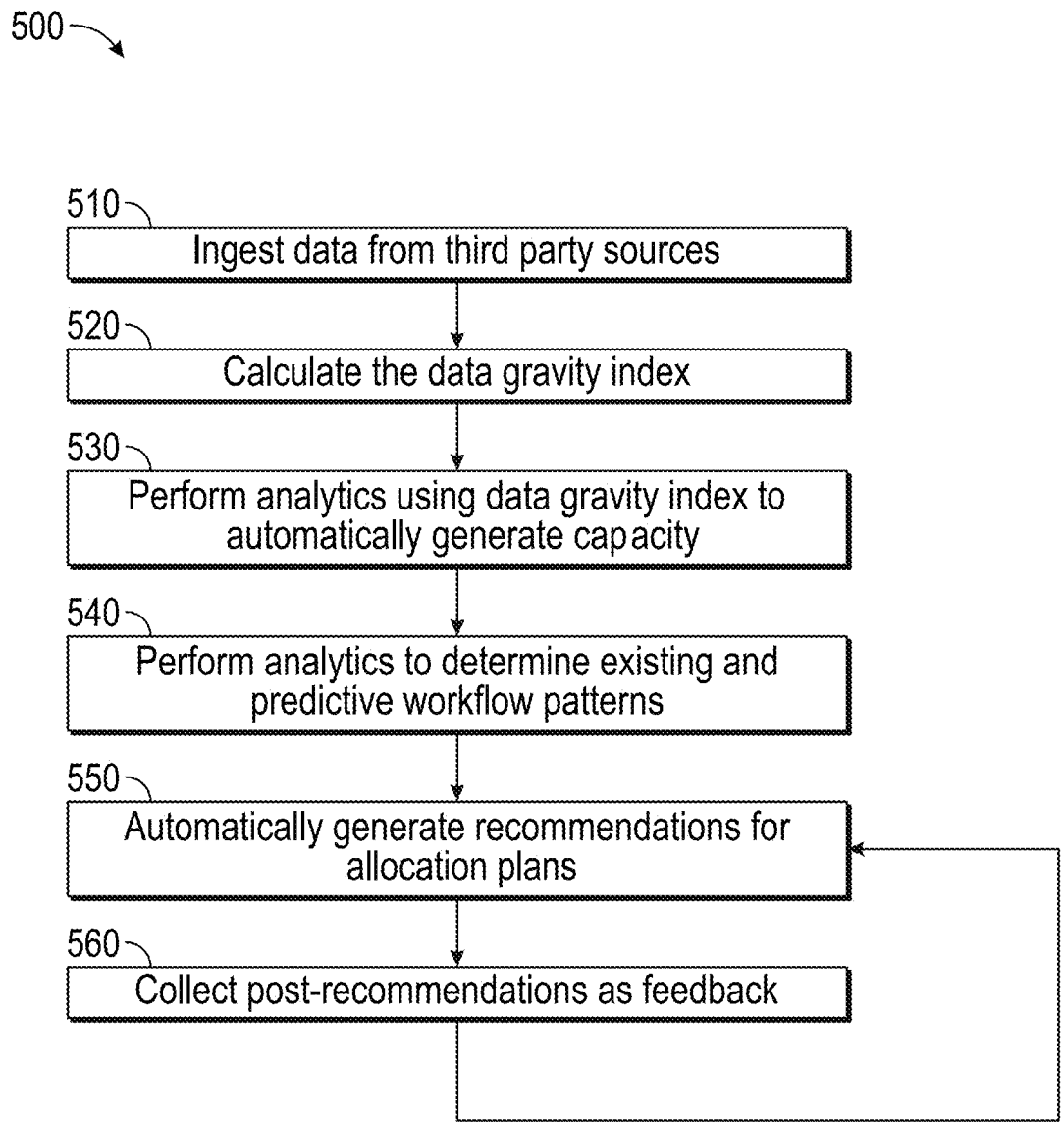
FIG. 5 is a block diagram illustrating an embodiment of a process of automated zoning.

In one embodiment, the Data Gravity analytics system 100 and/or the pervasive datacenter architecture 300 ("System") can perform a resource allocation analysis, for example, via one or more processors as shown in the embodiment of FIG. 5.

At block 510, the System begins with ingesting data from external sources. The System may include a user interface that allows a user to set parameters that selects a set of data, applies one or more filters to the data, limits the data selection to one or more segments, performs data cleansing, and/or links data from disparate data sets. In some embodiments, the System can receive data directly from third party systems, to make calls to request data from third party system or receive batch data updates. The System may aggregate data from the various sources and/or provide automated linking of the data to create logical ties among different data sets. As one example, the System may be used to assess healthcare data within the state of New Mexico.

At block 520, the System calculates a Data Gravity index using the following formula and selected data set:

$$((\text{data mass} * \text{data activity} * \text{bandwidth})/(\text{latency}^2)$$

where bandwidth is measured as the amount of data that can be transferred from one point to another within a network in a specific amount of time, and latency is the time it takes for data packets to be sent and acknowledged. Bandwidth may be expressed as a bitrate and can be measured in bits per second (bps). The Data Gravity index may be calculated on various subregions within the selected area (for example, cities, counties, and the like) and then use Data Gravity scores on the subregions to determine the Data Gravity index. For example, the System may determine that Data Gravity index is 158,306 for the state of New Mexico based on Data Gravity scores for each of the counties in New Mexico.

In block 530, the System analyzes the Data Gravity index to determine capacity in various areas. For example, the Data Gravity index may indicate that overall, there is capacity in the state of New Mexico but since the Data Gravity score for Bernalillo County is high, the capacity for Bernalillo County is insufficient for significant growth without additional storage and infrastructure.

In block 540, the System analyzes data, such as, for example, current workflow patterns, data generation patterns, data transmission patterns, data deletion patterns, and so forth. This analysis may be done by analyzing data from specific users, entities, applications, storage/work centers, and so forth along with time data so the pervasive datacenter architecture 300 can determine the current and expected workflow as well as the expected time of such workflow.

In block 550, the System automatically generates recommendations for a set of resource allocation plans. For example, the System may recommend funneling data that normally would be stored in Bernalillo County to the neighboring counties of Valencia Count, Torrance County, Santa Fe County, and Chibola County. The System may indicate that while Sandoval County is a neighboring county, and its Data Gravity score is moderately high such that funneling of data to that county would not be recommended.

Optionally, the System may analyze provided spend data to recommend certain network and infrastructure purchases. For example, the System may recommend Bernalillo County as well as Sandoval County to lease additional capacity from a cloud provider or multi-tenant provider.

Optionally, the System may provide recommended data routing schemes. For example, the System may also indicate that because the Data Gravity score for Torrance County is moderate, that the funneling of data to Torrance County should only occur for six months and data that was being funneled to Torrance County should be funneled to Valencia County after the six months have passed.

It is recognized that a variety of analytics could be used, such as, for example, recommendations for removing data from certain data centers via off-site archiving, rerouting of workflows to use specific networks or data centers, recommendations for increase in storage capacity, and recommendations for increase in networking technology, moving processing to different locations to facilitate working with increases in quantities of data, moving capacity to deal with changes based on events (present or future), such as a sporting event that will increase data output from IoT or mobile devices near a specific location.

In block 560, the System collects data after the recommendations have been implemented and fees that data into its analytics. This feedback loop may be used to retrain machine learning models or to determine variance levels on predicted results and actual results. This feedback loop may also be used to generate updated recommendations. For example, the System may determine that the prediction about the capacity of Torrance County was incorrect and that the excess capacity is being depleted at a faster rate than expected such that the System generates an updated recommendation to automatically halt funneling of data to Torrance County after three months (instead of six).

While a resource allocation example has been provided, it is recognized that a large number of use cases may be utilized. For example, the Data Gravity index may be used to determine data archiving plans, to recommend hardware spend, to recommend cloud computing rental recommendations, to determine options for growth areas, to provide alerts for potential system failures due to overcapacity, to plan for new residential communities, to plan for new commercial communities, to recommend storage in multi-tenant data centers, to plan for data processing capacity needs, to plan for network capacity and route needs. Moreover, the analyses can be done at other levels, such as over multiple metros areas, states, countries, or regions for a more comprehensive analysis.

Example Processing System

Figure 6:
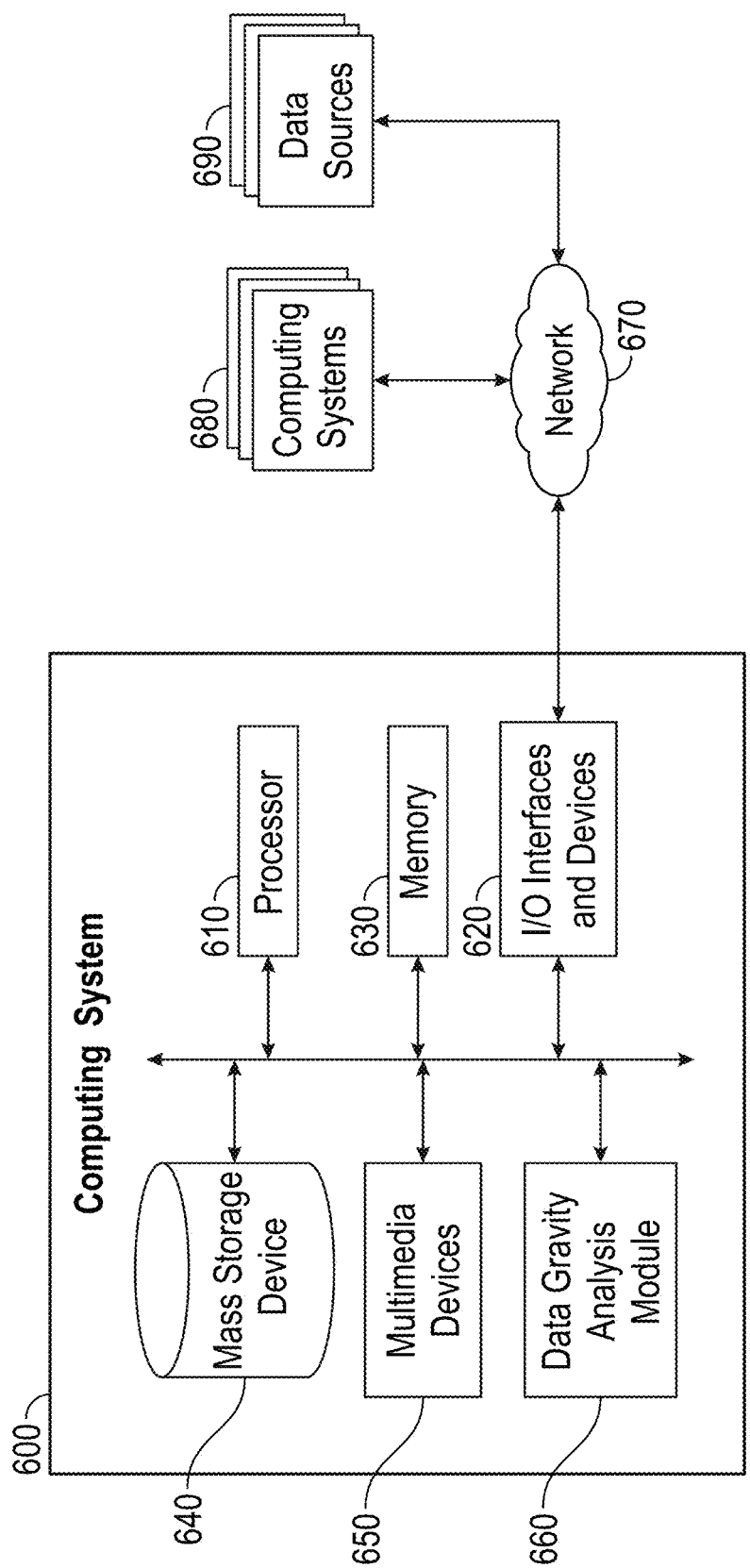
FIG. 6 is a general system diagram illustrating an embodiment of a computing system.

In some embodiments, any of the systems, devices, servers, or components referenced herein may take the form of a computing system as shown in FIG. 6 which illustrates a block diagram of one embodiment of a type of computing system 600. The exemplary computing system 600 includes a processor 610, which may include one or more conventional microprocessors that comprise hardware circuitry that can read computer-executable instructions and to cause portions of the hardware circuitry to perform operations specifically defined by the circuitry. The computing system 600 may also include a memory 630, such as random access memory ("RAM") for temporary storage of information and read only memory ("ROM") for permanent storage of information, which may store some or all of the computer-executable instructions prior to being communicated to the processor for execution. The computing system may also include one or more mass storage device 640, such as a hard drive, diskette, CD-ROM drive, a DVD-ROM drive, or optical media storage device, that may store the computer-executable instructions for relatively long periods, including, for example, when the computer system is turned off. Typically, the modules of the computing system are connected using a standard based bus system. In different embodiments, the standard based bus system could be Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system may be combined into fewer components and modules or further separated into additional components and modules. The illustrated structure of the computing system 600 may also be used to implement other computing components and systems described in the disclosure. It is recognized that the components discussed herein may be implemented as different types of components. For example, a server may be implemented as a module executing on a computing device, a mainframe may be implemented on a non-mainframe server, a server or other computing device may be implemented using two or more computing devices, and/or various components could be implemented using a single computing device.

Also, it is recognized that a variety of embodiments may be used and that some of the blocks in FIG. 6 may be combined, separated into sub-blocks, and rearranged to run in a different order and/or in parallel.

In one embodiment, the computing system 600 is a server, a workstation, a mainframe, a minicomputer. In other embodiments, the system may be a personal computer that is IBM, Macintosh, or Linux/Unix compatible, a laptop computer, a tablet, a handheld device, a mobile phone, a smart phone, a smart watch, a personal digital assistant, a car system, a tablet, or other user device. Servers may include a variety of servers such as database servers (for example, Oracle, DB2, Informix, Microsoft SQL Server, MySQL, or Ingres), application servers, data loader servers, or web servers. In addition, the servers may run a variety of software for data visualization, distributed file systems, distributed processing, web portals, enterprise workflow, form management, and so forth.

The computing system 600 may be generally controlled and coordinated by operating system software, such as, for example, Windows 7, Windows 8, Windows 10, Unix, Linux (and its variants such as Debian, Linux Mint, Fedora, and Red Hat), SunOS, Solaris, Maemo, MeeGo, BlackBerry Tablet OS, Android, webOS, Sugar, Symbian OS, MAC OS X, or iOS or other operating systems. In other embodiments, the computing system 600 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 600 includes one or more commonly available input/output ("I/O") devices and interfaces 620, such as a keyboard, mouse, touchpad, speaker, microphone, or printer. In one embodiment, the I/O devices and interfaces 620 include one or more display device, such as a touchscreen, display, or monitor, which allows the visual presentation of data to a user. More particularly, a display device provides for the presentation of GUIs, application software data, and multimedia presentations, for example. The processor 610 may be in communication with a display device that can perform some of the functions defined by the computer-executable instructions. For example, some of the computer-executable instructions may define the operation of displaying to a display device, an image that is like one of the screen shots included in this application. The computing system may also include one or more multimedia devices 650, such as speakers, video cards, graphics accelerators, and microphones, for example. A skilled artisan would appreciate that, in light of this disclosure, a system, including all hardware components, such as the processor 610, display device, memory 630, and mass storage device 640 that are necessary to perform the operations illustrated in this application, is within the scope of the disclosure.

In the embodiment of FIG. 6, the I/O devices and interfaces provide a communication interface to various external devices and systems. The computing system may be electronically coupled to a network 670, which comprises one or more of a LAN, WAN, the Internet, or cloud computing networks, for example, via a wired, wireless, or combination of wired and wireless, communication links. The network communicates with various systems or other systems 680 via wired or wireless communication links, as well as various data sources 690.

Information may be provided to the computing system 600 over the network 670 from one or more data sources. The network 670 may communicate with other data sources 690 or other computing devices 680 such as a third party survey provider system or database, for example. The data sources 690 may include one or more internal or external data sources. In some embodiments, one or more of the databases or data sources may be implemented using a relational database, such as Sybase, Oracle, Postgres, CodeBase, MySQL, and Microsoft® SQL Server as well as other types of databases such as, for example, a NoSQL database (for example, Couchbase, Cassandra, or MongoDB), a flat file database, an entity-relationship database, an object-oriented database, a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MogoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), or a record-based database.

In the embodiment of FIG. 6, the computing system 600 also includes a data gravity analysis module 660, which may be executed by the processor 610, to run one or more of the processes discussed herein. This system may include, by way of example, components, such as software components, object-oriented software components, class components, task components, processes, functions, attributes, procedures, subroutines, segments of program code, drivers, firmware, microcode, circuitry, data, databases, data structures, tables, arrays, or variables.

In some embodiments, all functions illustrated herein are performed on a single device. Alternatively, a distributed environment may be implemented in which the functions are collectively performed on two or more devices that are in communication with each other. Moreover, while the computing system has been used to describe one embodiment of a data gravity analysis 660, it is recognized that the user or customer systems may be implemented as computing systems as well. For example, the processor 610 can include a central processing unit ("CPU") that can perform the functions described herein. Additionally, the processor 610 can include a graphics processing unit ("GPU"), a specialized processor (for example, special-purpose programmable microprocessors, field-programmable gate arrays ("FPGA")), or a custom chip (for example, an application specific integrated circuit ("ASIC")) that can carry out a part of the computing or processing required to calculate (or predict or forecast) the Data Gravity index.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, Ruby, or Python. It will be appreciated that software modules may be callable from other modules or from themselves or may be invoked in response to detected events or interrupts. Software instructions may be embedded in firmware, such as an EPROM. It will be further appreciated that hardware modules may be comprised of connected logic units, such as gates and flip-flops, or may be comprised of programmable units, such as programmable gate arrays or processors. The modules described herein are preferably implemented as software modules but may be represented in hardware or firmware. Generally, the modules described herein refer to logical modules that may be combined with other modules or divided into sub-modules despite their physical organization or storage.

It is recognized that the term "remote" may include systems, data, objects, devices, components, or modules not stored locally, that are not accessible via the local bus. Thus, remote data may include a system that is physically stored in the same room and connected to the computing system via a network. In other situations, a remote device may also be located in a separate geographic area, such as, for example, in a different location, country, and so forth.

List of Example Numbered Embodiments

The following is a list of example numbered embodiments. The features recited in the below list of example embodiments can be combined with additional features disclosed herein. Furthermore, additional inventive combinations of features are disclosed herein, which are not specifically recited in the below list of example embodiments and which do not include the same features as the specific embodiments listed below. For sake of brevity, the below list of example embodiments does not identify every inventive aspect of this disclosure. The below list of example embodiments are not intended to identify key features or essential features of any subject matter described herein.

1. A system for assessing disparate storage of data among a number of storage devices, the system comprising:
a processor;
a memory;
a data gravity analytics configuration module;
a knowledge database stored in the memory; and
computer code stored in the memory, wherein the computer code, when retrieved from the memory and executed by the processor causes the processor to:
receive information about one or more nodes from a plurality of forensic source submitters, the one or more nodes being associated with:
a network,
mass data storage systems,
data characteristics including at least one of: data mass, data activity, bandwidth between at least two points, or latency;
data storage parameters,
one or more zone indicators, and
one or more Internet Protocol IP addresses,
wherein the submitters are registered contributors in providing aggregated data storage evidence;
identify, using the processor, a selected zone indicator received via a user interface;
select, using the processor, a subset of nodes based on the selected zone indicator, wherein each of the nodes in the subset of nodes is associated with selected zone indicator;
calculate, using the processor, a data gravity index score of the subset of nodes based at least in part on one or more of the selected zone indicator and data characteristics of each of the subset of nodes weighted according to a context;
update the knowledge database with the calculated data gravity index score; and
output, to the data gravity analytics configuration module, the calculated data gravity index score.

2. The system of embodiment 1 wherein the data gravity analytics configuration module is configured to automatically generate encrypted data packets comprising automated recommendations for one or more data storage parameters for the one or more nodes on the network based on the calculated data gravity index score and configured to instruct a network module to send the encrypted data packets to the one or more nodes.

3. The system of embodiment 1 or 2 wherein the data gravity analytics configuration module is configured to automatically generate automated recommendations or warning flags for one or more data storage parameters for the one or more nodes on the network based on the calculated data gravity index score.

4. The system of embodiment 3, wherein the automated recommendations comprise at least one of the following:
identify and deprioritize stale data of the one or more nodes;
implement additional local network ingress or egress for the one or more nodes;
adjust bandwidth for the one or more nodes;
adjust latency for the one or more nodes;
adjust data distribution between the one or more nodes; or
adjust data capacity for the one or more nodes.

5. The system of any of embodiments 1 to 4, wherein the data gravity analytics configuration module is configured to automatically generate instructions for rendering on a user interface flagged items based on the calculated data gravity index score.

6. The system of any of embodiments 1 to 5, wherein the data gravity analytics configuration module is configured to automatically generate and push out alerts to one or more remote systems based on the calculated data gravity index score.

7. The system of any of embodiments 1 to 6, wherein the data gravity analytics configuration module is configured to automatically generate instructions to remote systems based on the calculated data gravity index score.

8. The system of any of embodiments 1 to 7, wherein the data gravity index score is calculated according to the equation:

$$(((\text{data mass}*\text{data activity})^2)*\text{bandwidth})/(\text{latency}^2).$$

9. The system of embodiment 8, wherein an index score for each of the data mass, the data activity, the bandwidth, and the latency is calculated for each of the one or more nodes based at least in part on corresponding equations for the data mass, the data activity, the bandwidth, and the latency.

10. The system of any of embodiments 1 to 9, wherein the data gravity index score is calculated according to the equation:

$$(\text{data mass}*\text{data activity}*\text{bandwidth})/(\text{latency}^2).$$

11. The system of any of embodiments 1 to 10, wherein the data gravity index score is calculated using a machine learning module configured to identify one or more patterns associated with the data characteristics of the subset of nodes.

12. The system of any of embodiments 1 to 11, wherein the computer code further causes the processor to:

identify, using a machine learning model, one or more patterns associated with the data characteristics of the subset of nodes; and calculate, using the processor via the machine learning model, a predicted data gravity index score of the subset of nodes based at least in part on the one or more patterns.

13. The system of embodiment 12, wherein the predicted data gravity score is calculated without using a formula for calculating the data gravity index score.

14. The system of any of embodiments 1 to 13, wherein the computer code further causes the processor to:

receive a first updated data characteristics associated with the subset of nodes;

calculate, using the processor, a first updated data gravity index score associated with the subset of nodes based at least in part on the first updated data characteristics;

receive a second updated data characteristics associated with the subset of nodes;

calculate, using the processor, a second updated data gravity index score associated with the subset of nodes based at least in part on the second updated data characteristics; and calculate a predicted data gravity index score based at least in part on the first updated data gravity index score and the second updated data gravity index score.

15. The system of embodiment 14, wherein the computer code further causes the processor to:

receive one or more data storage parameters of the subset of nodes;

determine one or more patterns associated with the one or more data storage parameters;

request updated data characteristics of the subset of nodes based at least in part on the one or more patterns;

receive the requested updated data characteristics of the subset of nodes;

calculate an updated data gravity index based at least in part of the received updated data characteristics of the subset of nodes.

16. A computer-implemented method for assessing disparate storage of data among a number of storage devices, the computer-implemented method comprising, as implemented by one or more computing devices configured with specific executable instructions for:

receiving information about one or more nodes from a plurality of forensic source submitters, the one or more nodes being associated with:
a network,
mass data storage systems,
data characteristics including at least one of: data mass, data activity, bandwidth, or latency;
data storage parameters,
one or more zone indicators, and
one or more Internet Protocol IP addresses,
wherein the submitters are registered contributors in providing aggregated data storage evidence;

identifying a selected zone indicator received via a user interface;

selecting a subset of nodes based on the selected zone indicator, wherein each of the nodes in the subset of nodes is associated with selected zone indicator;

calculating a data gravity index score of the subset of nodes based at least in part on one or more of the selected zone indicator and data characteristics of each of the subset of nodes weighted according to a context;

updating the knowledge database with the calculated data gravity index score; and outputting the calculated data gravity index score.

17. The computer-implemented method of embodiment 16, wherein the specific executable instructions further include:

automatically generating encrypted data packets comprising automated recommendations for one or more data storage parameters for one nodes on the network based on the calculated data gravity index score and configured to instruct a network module to send the encrypted data packets to the one or more nodes 18. The computer-implemented method of any of embodiments 16 to 17, wherein the specific executable instructions further include:

automatically generating automated recommendations for one or more data storage parameters for one nodes on the network based on the calculated data gravity index score.

19. The computer-implemented method of any of embodiments 16 to 18, wherein the specific executable instructions further include:

automatically generating automated warning flags for one or more data storage parameters for one nodes on the network based on the calculated data gravity index score.

20. The computer-implemented method of any of embodiments 16 to 19, wherein the specific executable instructions further include automatically generating instructions for rendering on a user interface flagged items based on the calculated data gravity index score 21. The computer-implemented method of any of embodiments 16 to 20, wherein the specific executable instructions further include:

automatically generating and pushing out alerts to one or more remote systems based on the calculated data gravity index score.

22. The computer-implemented method of any of embodiments 16 to 21, wherein the specific executable instructions further include calculating the data gravity index score using the following formula:

$$(((data\ mass * data\ activity)^2) * bandwidth)/(latency^2).$$

23. The computer-implemented method of any of embodiments 16 to 22, wherein the specific executable instructions further include calculating the data gravity index score using the following formula:

$$(data\ mass * data\ activity * bandwidth)/(latency^2).$$

24. A non-transitory computer storage medium storing computer-executable instructions that, when executed by a processor, cause the processor to at least:

receive information about one or more nodes from a plurality of forensic source submitters, the one or more nodes being associated with:
a network,
mass data storage systems,
data characteristics including at least one of: data mass, data activity, bandwidth, or latency;
data storage parameters,
one or more zone indicators, and
one or more Internet Protocol IP addresses, wherein the submitters are registered contributors in providing aggregated data storage evidence;

identify a selected zone indicator received via a user interface;

select a subset of nodes based on the selected zone indicator, wherein each of the nodes in the subset of nodes is associated with selected zone indicator;

calculate a data gravity index score of the subset of nodes based at least in part on one or more of the selected zone indicator and data characteristics of each of the subset of nodes weighted according to a context;

update the knowledge database with the calculated data gravity index score; and output the calculated data gravity index score.

25. The non-transitory computer storage medium of embodiment 24, further storing computer-executable instructions that:

automatically generate encrypted data packets comprising automated recommendations for one or more data storage parameters for one nodes on the network based on the calculated data gravity index score and configured to instruct a network module to send the encrypted data packets to the one or more nodes 26. The non-transitory computer storage medium of any of embodiments 24 to 25, further storing computer-executable instructions that:

automatically generate automated recommendations for one or more data storage parameters for one nodes on the network based on the calculated data gravity index score.

27. The non-transitory computer storage medium of any of embodiments 24 to 26, further storing computer-executable instructions that:

automatically generate automated warning flags for one or more data storage parameters for one nodes on the network based on the calculated data gravity index score.

28. The non-transitory computer storage medium of any of embodiments 24 to 27, further storing computer-executable instructions that:

automatically generate instructions for rendering on a user interface flagged items based on the calculated data gravity index score 29. The non-transitory computer storage medium of any of embodiments 24 to 28, further storing computer-executable instructions that:

automatically generate and push out alerts to one or more remote systems based on the calculated data gravity index score.

30. The non-transitory computer storage medium of any of embodiments 24 to 29, further storing computer-executable instructions that calculate the data gravity index score using the following formula:

$$(((\text{data mass} * \text{data activity})^{\wedge}2) * \text{bandwidth})/(\text{latency}^{\wedge}2).$$

31. The non-transitory computer storage medium of any of embodiments 24 to 30, further storing computer-executable instructions that calculate the data gravity index score using the following formula:

$$((\text{data mass} * \text{data activity} * \text{bandwidth})/(\text{latency}^{\wedge}2).$$

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

As used herein, the terms "determine" or "determining" encompass a wide variety of actions. For example, "determining" may include calculating, computing, processing, deriving, generating, obtaining, looking up (for example, looking up in a table, a database, or another data structure), ascertaining and the like via a hardware element without user intervention. Also, "determining" may include receiving (for example, receiving information), accessing (for example, accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (for example, transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, and so forth in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry that can provide an output indicating the result of the generating. The combination may be dynamically performed such as through dynamic selection of execution paths based on, for example, the input information, device operational characteristics (for example, hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein, "activate" or "activating" may refer to causing or triggering a mechanical, electronic, or electromechanical state change to a device. Activation of a device may cause the device, or a feature associated therewith, to change from a first state to a second state. In some implementations, activation may include changing a characteristic from a first state to a second state such as, for example, changing the viewing state of a lens of stereoscopic viewing glasses. Activating may include generating a control message indicating the desired state change and providing the control message to the device to cause the device to change state.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, spinning-disk (hard drives) and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A system comprising:
a processor;
a memory; and
computer code stored in the memory, wherein the computer code, when retrieved from the memory and executed by the processor causes the processor to:
receive information about one or more nodes from a plurality of submitters, the one or more nodes being associated with:
a network,
mass data storage systems,
data characteristics including at least one of: data mass, data activity, bandwidth between at least two points, or latency;

data storage parameters,
one or more zone indicators, and
one or more Internet Protocol IP addresses,
wherein the plurality of submitters are registered contributors in providing aggregated data storage evidence;
identify, using the processor, a selected zone indicator received via a user interface;
select, using the processor, a subset of nodes based on the selected zone indicator, wherein each node in the subset of nodes is associated with the selected zone indicator;
generate, using the processor, an index score of the subset of nodes based at least in part on one or more data characteristics of each of the subset of nodes weighted according to a context, the index score indicating a metric of data accumulation; and
based at least in part on comparison of the index score to a threshold:
identify, using the processor, stale data for rotation; and
initiate, using the processor, rotation of the stale data from one or more mass data storage systems associated with the selected zone indicator, wherein rotation of the stale data includes one or more of: archiving, downgrading, or reprioritization of the stale data.

2. The system of claim 1, wherein the system is configured to automatically generate warning flags for one or more data storage parameters for the one or more nodes on the network based on the index score.

3. The system of claim 1, wherein the system is configured to transfer the stale data from the one or more mass data storage systems to a remote system.

4. The system of claim 1, wherein the system is configured to automatically generate instructions for rendering on a user interface flagged items based on the index score.

5. The system of claim 1, wherein the rotation of the stale data is initiated based on user instructions received by the system.

6. The system of claim 1, wherein the system is configured to automatically generate encrypted data packets comprising automated recommendations for one or more data storage parameters for the one or more nodes on the network based on the index score and configured to instruct a network module to send the encrypted data packets to the one or more nodes.

7. The system of claim 1, wherein the index score is calculated using a machine learning module configured to identify one or more patterns associated with the data characteristics of the subset of nodes.

8. A computer-implemented method comprising, as implemented by one or more computing devices configured with specific executable instructions:
receiving information about one or more nodes from a plurality of submitters, the one or more nodes being associated with:
a network,
mass data storage systems,
data characteristics including at least one of: data mass, data activity, bandwidth, or latency;
data storage parameters,
one or more zone indicators, and
one or more Internet Protocol IP addresses,
wherein the plurality of submitters are registered contributors in providing aggregated data storage evidence;
identifying a selected zone indicator received via a user interface;
selecting a subset of nodes based on the selected zone indicator, wherein each node in the subset of nodes is associated with the selected zone indicator;
generating an index score of the subset of nodes based at least in part on one or more data characteristics of each of the subset of nodes weighted according to a context, the index score indicating a metric of data accumulation; and
based at least in part on comparison of the index score to a threshold:
identifying stale data for rotation; and
initiating rotation of the stale data from one or more mass data storage systems associated with the selected zone indicator, wherein rotation of the stale data includes one or more of: archiving, downgrading, or reprioritization of the stale data.

9. The computer-implemented method of claim 8, wherein the specific executable instructions further include:
automatically generating warning flags for one or more data storage parameters for the one or more nodes on the network based on the index score.

10. The computer-implemented method of claim 8, wherein the rotation of the stale data is initiated based on user instruction.

11. The computer-implemented method of claim 8, wherein the specific executable instructions further include:
automatically generating instructions for rendering on a user interface flagged items based on the index score.

12. The computer-implemented method of claim 8, wherein the specific executable instructions further include:
transferring the stale data from one or more mass storage systems to a remote system.

13. The computer-implemented method of claim 8, wherein the specific executable instructions further include:
automatically generating encrypted data packets comprising automated recommendations for one or more data storage parameters for the one or more nodes on the network based on the index score; and
instructing a network module to send the encrypted data packets to the one or more nodes.

14. The computer-implemented method of claim 8, wherein the index score is calculated using a machine learning module configured to identify one or more patterns associated with the data characteristics of the subset of nodes.

15. A non-transitory computer storage medium storing computer-executable instructions that, when executed by a processor, cause the processor to at least:
receive information about one or more nodes from a plurality of submitters, the one or more nodes being associated with:
a network,
mass data storage systems,
data characteristics including at least one of: data mass, data activity, bandwidth, or latency;
data storage parameters,
one or more zone indicators, and
one or more Internet Protocol IP addresses,
wherein the plurality of submitters are registered contributors in providing aggregated data storage evidence;
identify a selected zone indicator received via a user interface;

select a subset of nodes based on the selected zone indicator, wherein each node in the subset of nodes is associated with the selected zone indicator;

generate an index score of the subset of nodes based at least in part on one or more data characteristics of each of the subset of nodes weighted according to a context, the index score indicating a metric of data accumulation; and based at least in part on comparison of the index score to a threshold:
    identify stale data for rotation; and
    initiate rotation of the stale data from one or more mass data storage systems associated with the selected zone indicator, wherein rotation of the stale data includes one or more of: archiving, downgrading, or reprioritization of the stale data.

16. The non-transitory computer storage medium of claim 15, further storing computer-executable instructions that:
automatically generate warning flags for one or more data storage parameters for the one or more nodes on the network based on the index score.

17. The non-transitory computer storage medium of claim 15, further storing computer-executable instructions that:
transfer the stale data from one or more mass storage systems to a remote system.

18. The non-transitory computer storage medium of claim 17, further storing computer-executable instructions that:
automatically generate instructions for rendering on a user interface flagged items based on the index score.

19. The non-transitory computer storage medium of claim 15, further storing computer-executable instructions that:
automatically generate encrypted data packets comprising automated recommendations for one or more data storage parameters for the one or more nodes on the network based on the index score; and
instruct a network module to send the encrypted data packets to the one or more nodes.

20. The non-transitory computer storage medium of claim 15, wherein the index score is calculated using a machine learning module configured to identify one or more patterns associated with the data characteristics of the subset of nodes.

\* \* \* \* \*